(12) United States Patent
Liu et al.

(10) Patent No.: US 8,623,213 B2
(45) Date of Patent: Jan. 7, 2014

(54) HYBRID AEROBIC AND ANAEROBIC WASTEWATER AND SLUDGE TREATMENT SYSTEMS AND METHODS

(75) Inventors: Wenjun Liu, Wayne, PA (US); Edward J. Jordan, Lenexa, KS (US); Joseph E. Zuback, Camarillo, CA (US); George W. Smith, Pewaukee, WI (US)

(73) Assignee: Siemens Water Technologies LLC, Alpharetta, GA (US)

( * ) Notice: Subject to any disclaimer, the term of this patent is extended or adjusted under 35 U.S.C. 154(b) by 484 days.

(21) Appl. No.: 12/934,927

(22) PCT Filed: Mar. 27, 2009

(86) PCT No.: PCT/US2009/001949
§ 371 (c)(1),
(2), (4) Date: Dec. 13, 2010

(87) PCT Pub. No.: WO2009/120384
PCT Pub. Date: Oct. 1, 2009

(65) Prior Publication Data
US 2011/0089105 A1    Apr. 21, 2011

Related U.S. Application Data

(60) Provisional application No. 61/040,179, filed on Mar. 28, 2008, provisional application No. 61/041,720, filed on Apr. 2, 2008, provisional application No. 61/046,631, filed on Apr. 21, 2008.

(51) Int. Cl.
*C02F 3/30* (2006.01)

(52) U.S. Cl.
USPC ........... 210/605; 210/614; 210/622; 210/623; 210/259

(58) Field of Classification Search
USPC ......... 210/603, 605, 614, 623, 630, 252, 259, 210/622
See application file for complete search history.

(56) References Cited

U.S. PATENT DOCUMENTS

| | | | |
|---|---|---|---|
| 1,712,258 A | 5/1929 | Compain | |
| 1,833,315 A | 11/1931 | Burhans | |
| 2,359,004 A * | 9/1944 | Schlenz et al. | 210/605 |
| 2,893,957 A | 7/1959 | Genter et al. | |
| 2,964,194 A | 12/1960 | Oliver, Jr. et al. | |
| 3,047,492 A | 7/1962 | Gambrel | |

(Continued)

FOREIGN PATENT DOCUMENTS

| | | |
|---|---|---|
| CA | 2149090 | 11/1996 |
| DE | 4238708 | 5/1994 |

(Continued)

OTHER PUBLICATIONS

Official action from Mexican application No. Mx/a/2010/010532 dated Jan. 25, 2013.*

(Continued)

*Primary Examiner* — Fred Prince

(57) ABSTRACT

A hybrid method and system of treating wastewater with reduced energy usage is disclosed. The treatment system has a sorption system, an anaerobic digester that digests or converts at least a portion of the solids or sludge from the sorption system, and an aerobic treatment tank that partially reduces oxygen demand of a portion of the sludge from the sorption tank.

40 Claims, 9 Drawing Sheets

(56) References Cited

U.S. PATENT DOCUMENTS

| | | | |
|---|---|---|---|
| 3,163,601 A | 12/1964 | Ericson et al. | |
| 3,192,155 A | 6/1965 | Bready et al. | |
| 3,259,566 A | 7/1966 | Torpey | |
| 3,331,512 A | 7/1967 | Vore | |
| 3,363,770 A | 1/1968 | Glos, II | |
| 3,369,668 A | 2/1968 | Glos, II | |
| 3,544,476 A | 12/1970 | Aiba et al. | |
| 3,595,537 A | 7/1971 | Kaelin | |
| 3,610,419 A | 10/1971 | Vallee | |
| 3,617,540 A | 11/1971 | Bishop et al. | |
| 3,643,803 A | 2/1972 | Glos, II | |
| 3,756,946 A | 9/1973 | Levin et al. | |
| 3,787,316 A | 1/1974 | Brink et al. | |
| 3,907,672 A | 9/1975 | Milne | |
| 3,948,779 A | 4/1976 | Jackson | |
| 3,964,998 A | 6/1976 | Barnard | |
| 4,042,493 A | 8/1977 | Matsch et al. | |
| 4,056,465 A | 11/1977 | Spector | |
| 4,132,638 A | 1/1979 | Carlsson | |
| 4,139,472 A | 2/1979 | Simonson | |
| 4,141,822 A | 2/1979 | Levin et al. | |
| 4,160,724 A | 7/1979 | Laughton | |
| 4,162,153 A | 7/1979 | Spector | |
| 4,162,982 A | 7/1979 | Chesner | |
| 4,173,531 A | 11/1979 | Matsch et al. | |
| 4,180,459 A | 12/1979 | Zievers | |
| 4,256,580 A | 3/1981 | Rimmele | |
| 4,268,385 A | 5/1981 | Yoshikawa | |
| 4,271,026 A | 6/1981 | Chen et al. | |
| 4,277,342 A | 7/1981 | Hayes et al. | |
| 4,279,753 A | 7/1981 | Nielson et al. | |
| 4,284,510 A | 8/1981 | Savard et al. | |
| 4,323,367 A | 4/1982 | Ghosh | |
| 4,330,405 A | 5/1982 | Davis et al. | |
| 4,346,008 A | 8/1982 | Leighton et al. | |
| 4,351,729 A | 9/1982 | Witt | |
| 4,370,233 A | 1/1983 | Hayes et al. | |
| 4,374,730 A | 2/1983 | Braha et al. | |
| 4,407,717 A | 10/1983 | Teletzke et al. | |
| 4,442,005 A * | 4/1984 | Breider | 210/614 |
| 4,491,522 A | 1/1985 | Ishida et al. | |
| 4,522,722 A | 6/1985 | Nicholas | |
| 4,527,947 A | 7/1985 | Elliott | |
| 4,537,682 A | 8/1985 | Wong-Chong | |
| 4,548,715 A | 10/1985 | Stein | |
| 4,568,457 A | 2/1986 | Sullivan | |
| 4,568,462 A | 2/1986 | Bohnke et al. | |
| 4,599,167 A | 7/1986 | Benjes et al. | |
| 4,632,758 A | 12/1986 | Whittle | |
| 4,643,830 A | 2/1987 | Reid | |
| 4,655,920 A | 4/1987 | Ragnegard | |
| 4,664,804 A | 5/1987 | Morper et al. | |
| RE32,429 E | 6/1987 | Spector | |
| 4,675,114 A | 6/1987 | Zagyvai et al. | |
| 4,705,633 A | 11/1987 | Bogusch | |
| 4,710,301 A | 12/1987 | Geuens | |
| 4,731,185 A | 3/1988 | Chen et al. | |
| 4,780,198 A | 10/1988 | Crawford et al. | |
| 4,790,939 A | 12/1988 | Suzuki et al. | |
| 4,797,212 A | 1/1989 | Von Nordenskjold | |
| 4,814,093 A | 3/1989 | Frykhult | |
| 4,818,391 A | 4/1989 | Love | |
| 4,838,910 A | 6/1989 | Stollenwerk et al. | |
| 4,842,732 A | 6/1989 | Tharp | |
| 4,849,108 A | 7/1989 | De Wilde et al. | |
| 4,865,732 A | 9/1989 | Garrant et al. | |
| 4,867,883 A | 9/1989 | Daigger et al. | |
| 4,874,519 A | 10/1989 | Williamson | |
| 4,891,136 A | 1/1990 | Voyt | |
| 4,915,840 A | 4/1990 | Rozich | |
| 4,950,403 A | 8/1990 | Hauff et al. | |
| 4,956,094 A | 9/1990 | Levin et al. | |
| 4,961,854 A | 10/1990 | Wittmann et al. | |
| 4,975,197 A | 12/1990 | Wittmann et al. | |
| 4,999,111 A | 3/1991 | Williamson | |
| 5,013,442 A | 5/1991 | Davis et al. | |
| 5,019,266 A | 5/1991 | Soeder et al. | |
| 5,022,993 A | 6/1991 | Williamson | |
| 5,051,191 A | 9/1991 | Rasmussen et al. | |
| 5,076,924 A | 12/1991 | Persson et al. | |
| 5,084,174 A | 1/1992 | Perala et al. | |
| 5,087,358 A | 2/1992 | Massignani | |
| 5,094,752 A | 3/1992 | Davis et al. | |
| 5,098,567 A | 3/1992 | Nishiguchi | |
| 5,098,572 A | 3/1992 | Faup et al. | |
| 5,114,587 A | 5/1992 | Hagerstedt | |
| 5,126,049 A | 6/1992 | Hallberg | |
| 5,128,040 A | 7/1992 | Molof et al. | |
| 5,137,636 A | 8/1992 | Bundgaard | |
| 5,151,187 A | 9/1992 | Behmann | |
| 5,182,021 A | 1/1993 | Spector | |
| 5,227,065 A | 7/1993 | Strid | |
| 5,234,595 A | 8/1993 | DiGregorio et al. | |
| 5,242,590 A | 9/1993 | Thomson et al. | |
| 5,246,585 A | 9/1993 | Meiring | |
| 5,254,253 A | 10/1993 | Behmann | |
| 5,282,980 A * | 2/1994 | Kew et al. | 210/787 |
| 5,288,405 A | 2/1994 | Lamb, III | |
| 5,288,406 A | 2/1994 | Stein | |
| 5,296,143 A | 3/1994 | Frykhult | |
| 5,304,308 A | 4/1994 | Tsumura et al. | |
| 5,316,682 A | 5/1994 | Keyser et al. | |
| 5,330,645 A | 7/1994 | Geldmacher | |
| 5,330,646 A | 7/1994 | Frykhult | |
| 5,336,290 A | 8/1994 | Jermstad | |
| 5,342,522 A | 8/1994 | Marsman et al. | |
| 5,348,653 A | 9/1994 | Rovel | |
| 5,348,655 A | 9/1994 | Simas et al. | |
| 5,356,537 A | 10/1994 | Thurmond et al. | |
| 5,376,242 A | 12/1994 | Hayakawa | |
| 5,380,438 A | 1/1995 | Nungesser | |
| 5,389,258 A | 2/1995 | Smis et al. | |
| 5,480,548 A | 1/1996 | Daigger et al. | |
| 5,482,630 A | 1/1996 | Lee et al. | |
| 5,505,862 A | 4/1996 | Sonnenrein | |
| 5,514,277 A | 5/1996 | Khudenko | |
| 5,514,278 A | 5/1996 | Khudenko | |
| 5,531,896 A | 7/1996 | Tambo et al. | |
| 5,543,051 A | 8/1996 | Harris | |
| 5,543,063 A | 8/1996 | Walker et al. | |
| 5,582,734 A | 12/1996 | Coleman et al. | |
| 5,601,719 A | 2/1997 | Hawkins et al. | |
| 5,611,927 A | 3/1997 | Schmid | |
| 5,624,562 A | 4/1997 | Scroggins | |
| 5,624,565 A | 4/1997 | Lefevre et al. | |
| 5,626,755 A | 5/1997 | Keyser et al. | |
| 5,635,062 A | 6/1997 | Cameron et al. | |
| 5,647,982 A | 7/1997 | Haythornthwaite | |
| 5,650,069 A | 7/1997 | Hong et al. | |
| 5,651,891 A | 7/1997 | Molof et al. | |
| 5,658,458 A | 8/1997 | Keyser et al. | |
| 5,667,680 A | 9/1997 | Haeffner | |
| 5,685,983 A | 11/1997 | Frykhult | |
| 5,725,772 A | 3/1998 | Shirodkar | |
| 5,733,455 A | 3/1998 | Molof et al. | |
| 5,733,456 A | 3/1998 | Okey et al. | |
| 5,746,919 A | 5/1998 | Dague et al. | |
| 5,750,041 A | 5/1998 | Hirane | |
| 5,766,466 A | 6/1998 | Peterson | |
| 5,773,526 A | 6/1998 | Van Dijk et al. | |
| 5,792,352 A | 8/1998 | Scheucher et al. | |
| 5,804,071 A | 9/1998 | Haeffner | |
| 5,811,008 A | 9/1998 | Von Nordenskjold | |
| 5,818,412 A | 10/1998 | Maekawa | |
| 5,820,756 A | 10/1998 | McEwen et al. | |
| 5,824,222 A | 10/1998 | Keyser et al. | |
| 5,833,856 A | 11/1998 | Liu et al. | |
| 5,846,424 A | 12/1998 | Khudenko | |
| 5,853,588 A | 12/1998 | Molof et al. | |
| 5,858,222 A | 1/1999 | Shibata et al. | |
| 5,919,367 A | 7/1999 | Khudenko | |
| 5,928,396 A | 7/1999 | Choi | |
| 5,989,428 A | 11/1999 | Goronszy | |
| 5,993,503 A | 11/1999 | Kruidhof | |

(56) References Cited

U.S. PATENT DOCUMENTS

| | | |
|---|---|---|
| 6,004,463 A | 12/1999 | Swett |
| 6,015,496 A | 1/2000 | Khudenko |
| 6,036,862 A | 3/2000 | Stover |
| 6,039,874 A | 3/2000 | Teran et al. |
| 6,047,768 A | 4/2000 | Buehler, III |
| 6,054,044 A | 4/2000 | Hoffland et al. |
| 6,066,256 A | 5/2000 | Henry et al. |
| 6,077,430 A | 6/2000 | Chudoba et al. |
| 6,093,322 A | 7/2000 | Bongards |
| 6,110,389 A | 8/2000 | Horowitz |
| 6,113,788 A | 9/2000 | Molof et al. |
| 6,117,323 A | 9/2000 | Haggerty |
| 6,193,889 B1 | 2/2001 | Teran et al. |
| 6,217,768 B1 | 4/2001 | Hansen et al. |
| 6,231,761 B1 | 5/2001 | Mohlin et al. |
| 6,352,643 B1 | 3/2002 | Kwon et al. |
| 6,383,387 B2 | 5/2002 | Hasegawa et al. |
| 6,383,389 B1 | 5/2002 | Pilgram et al. |
| 6,416,668 B1 | 7/2002 | Al-Samadi |
| 6,423,229 B1 | 7/2002 | Mao |
| 6,447,617 B1 | 9/2002 | Bergmann |
| 6,454,949 B1 | 9/2002 | Sesay et al. |
| 6,527,956 B1 | 3/2003 | Lefevre et al. |
| 6,555,002 B2 | 4/2003 | Garcia et al. |
| 6,562,237 B1 | 5/2003 | Olaopa |
| 6,585,895 B2 | 7/2003 | Smith et al. |
| 6,592,762 B2 | 7/2003 | Smith |
| 6,605,220 B2 | 8/2003 | Garcia et al. |
| 6,613,238 B2 | 9/2003 | Schloss |
| 6,630,067 B2 | 10/2003 | Shieh et al. |
| 6,660,163 B2 | 12/2003 | Miklos |
| 6,666,965 B1 | 12/2003 | Timmons |
| 6,706,185 B2 | 3/2004 | Goel et al. |
| 6,712,970 B1 | 3/2004 | Trivedi |
| 6,783,679 B1 | 8/2004 | Rozich |
| 6,787,035 B2 | 9/2004 | Wang |
| D497,660 S | 10/2004 | Danielsson et al. |
| 6,805,806 B2 | 10/2004 | Arnaud |
| 6,814,868 B2 | 11/2004 | Phagoo et al. |
| 6,833,074 B2 | 12/2004 | Miklos |
| 6,863,818 B2 | 3/2005 | Daigger et al. |
| 6,884,355 B2 | 4/2005 | Kamiya et al. |
| 6,893,567 B1 | 5/2005 | Vanotti et al. |
| 7,105,091 B2 | 9/2006 | Miklos |
| 7,147,778 B1 | 12/2006 | DiMassimo et al. |
| 7,156,998 B2 * | 1/2007 | Reid ............... 210/605 |
| 7,208,090 B2 | 4/2007 | Applegate et al. |
| 7,255,723 B2 | 8/2007 | Choi et al. |
| 7,258,791 B2 | 8/2007 | Matsumoto |
| 7,293,659 B2 | 11/2007 | Grace |
| 7,309,427 B2 | 12/2007 | Kruse et al. |
| 7,314,556 B2 | 1/2008 | Sheets et al. |
| 7,314,564 B2 | 1/2008 | Kruse et al. |
| 7,413,654 B2 | 8/2008 | Applegate et al. |
| 7,473,364 B2 | 1/2009 | Abu-Orf |
| 7,569,147 B2 | 8/2009 | Curtis et al. |
| 7,597,805 B2 | 10/2009 | Danielsson et al. |
| 2001/0045390 A1 | 11/2001 | Kim et al. |
| 2002/0030003 A1 | 3/2002 | O'Leary et al. |
| 2002/0050283 A1 | 5/2002 | Bergmann |
| 2002/0185434 A1 | 12/2002 | Mao |
| 2002/0195388 A1 | 12/2002 | Sierens et al. |
| 2004/0004038 A1 | 1/2004 | Yamaguchi et al. |
| 2004/0016698 A1 | 1/2004 | Unger |
| 2004/0206699 A1 | 10/2004 | Ho et al. |
| 2004/0232076 A1 | 11/2004 | Zha et al. |
| 2005/0035059 A1 * | 2/2005 | Zhang et al. ............ 210/605 |
| 2005/0040103 A1 | 2/2005 | Abu-Orf et al. |
| 2005/0045557 A1 | 3/2005 | Daigger et al. |
| 2005/0061737 A1 | 3/2005 | Linden et al. |
| 2005/0194310 A1 | 9/2005 | Yamamoto et al. |
| 2006/0113243 A1 | 6/2006 | Applegate et al. |
| 2006/0124543 A1 | 6/2006 | Pehrson et al. |
| 2006/0249448 A1 | 11/2006 | Fujishima et al. |
| 2006/0249449 A1 | 11/2006 | Nakhla et al. |
| 2007/0000836 A1 | 1/2007 | Elefritz et al. |
| 2007/0045181 A1 | 3/2007 | Brase |
| 2007/0051677 A1 | 3/2007 | Curtis et al. |
| 2007/0193949 A1 | 8/2007 | You et al. |
| 2008/0041783 A1 | 2/2008 | Barnes |
| 2008/0223783 A1 | 9/2008 | Sutton |
| 2009/0014387 A1 | 1/2009 | Probst |
| 2009/0078646 A1 | 3/2009 | Curtis et al. |
| 2011/0089105 A1 | 4/2011 | Liu et al. |
| 2011/0132836 A1 | 6/2011 | Olson |

FOREIGN PATENT DOCUMENTS

| | | |
|---|---|---|
| DE | 4444335 | 6/1996 |
| EP | 0106043 | 4/1984 |
| EP | 0408878 | 1/1991 |
| EP | 0440996 | 8/1991 |
| EP | 0497114 A1 | 8/1992 |
| EP | 1236686 | 9/2002 |
| EP | 1596958 | 6/2006 |
| FR | 2595957 | 9/1987 |
| FR | 2674844 A1 | 10/1992 |
| FR | 2766813 B1 | 10/1999 |
| FR | 2843106 B1 | 10/2004 |
| GB | 957991 | 5/1964 |
| GB | 1438697 A | 6/1976 |
| GB | 1441241 A | 6/1976 |
| GB | 2006743 | 5/1979 |
| JP | 59032999 | 2/1984 |
| JP | 59052597 | 3/1984 |
| JP | 60-84199 | 5/1985 |
| JP | 61192389 | 8/1986 |
| JP | 63130197 | 6/1988 |
| JP | 62138986 | 12/1988 |
| JP | 63302996 | 12/1988 |
| JP | 01174949 | 2/1991 |
| JP | 3042019 | 2/1991 |
| JP | 6091285 | 4/1994 |
| JP | 07-16589 | 1/1995 |
| JP | 2000-199086 | 7/2000 |
| JP | 2000210542 | 8/2000 |
| JP | 2001347296 A | 12/2001 |
| JP | 2002035779 A | 2/2002 |
| JP | 2002126800 | 8/2002 |
| JP | 2003033780 A | 2/2003 |
| JP | 2006082024 A | 3/2006 |
| NL | 9301791 | 10/1993 |
| RU | 1596752 | 9/1995 |
| WO | 9112067 | 8/1991 |
| WO | 9315026 | 8/1993 |
| WO | 9424055 | 10/1994 |
| WO | 9735656 | 10/1997 |
| WO | 9801397 A1 | 1/1998 |
| WO | 03039712 | 5/2003 |
| WO | 03041837 | 5/2003 |
| WO | 03051487 | 6/2003 |
| WO | 03072512 | 9/2003 |
| WO | 2004076026 | 9/2004 |
| WO | 2009086584 | 7/2009 |
| WO | 2009120384 | 10/2009 |

OTHER PUBLICATIONS

Abu-Orf et al., "Chemical and Physical Pretreatment of ATAD Biosolids for Dewatering," Water Science Technology, 2001, vol. 44, No. 10, pp. 309-314, IWA Publishing.

Abu-Orf et al., "Adjusting Floc Cations to Improve Effluent Quality: The Case of Aluminum Addition at Sioux City Wastewater Treatment Facility," Water Environment Federation, 2004, 16 pages.

Bakker, Chapter IIA, "Cell K+ and K+ Transport Systems in Prokaryotes," In Alkali Cation Transport Systems in Prokaryotes, Bakker, E.P., 1993, pp. 205-224, CRC Press.

Bishop et al., "Fate of Nutrients during Aerobic Digestion," Journal Environ. Eng. Div. Proc. Am. Soc. Civil Eng., 1978, vol. 104, No. EE5, pp. 967-979.

Bruus et al., "On the Stability of Activated Sludge Flocs with Implications to Dewatering," Water Research, 1992, vol. 26, No. 12, pp. 1597-1604, Pergamon Press Ltd.

(56) References Cited

OTHER PUBLICATIONS

Caulet et al., "Modulated Aeration Management by Combined ORP and DO Control: A Guarantee of Quality and Power Savings for Carbon and Nitrogen Removal in Full Scale Wastewater Treatment Plants," Center of International Research for Water Environment, France, 1999.
Chudoba et al., "Pre-Denitrification Performance of a High-Loaded Anoxic Sludge," Degremont Research Center, France, 1999.
Charpentier et al., ORP Regulation and Activated Sludge, 15 years of Experience, 19th Biennial Conference/AWQ of Vancouver—Jun. 1998.
Chen et al., "Minimization of activated sludge production by chemically stimulated energy spilling," Water Science and Technology, 2000, pp. 189-200, vol. 42, No. 12, IWA Publishing.
Chen et al., "Effect of Sludge Fasting/Feasting on Growth of Activated Sludge Cultures," Wat. Res., 2001, pp. 1029-1037, vol. 35, No. 4, Elsevier Science Ltd., Pergamon.
Chudoba et al., "The Aspect of Energetic Uncoupling of Microbial Growth in the Activated Sludge Process-OSA System," Water Science and Technology, 1992, pp. 2477-2480, vol. 26, No. 9-11, IAWPRC.
"Contrashear filter solutions for waste water," for Contra ShearTM, Jul. 29, 2005, p. 1 of 1, http://www.contrashear.co.nz/.
Dignac et al., "Chemical Description of Extracellular Polymers" Implication on Activated Sludge Floc Structure, Water Science Technology, 1998, vol. 38, No. 8-9, pp. 45-53, Elsevier Science Ltd.
Dubois et al., "Colorimetric Method for Determination of Sugars and Related Substances," Analytical Chemistry, 1956, vol. 28, No. 3, pp. 350-356.
"Efficient treatment of high strength industrial and municipal wastewater" brochure by Envirex Inc., Jan. 1990.
Ekama et al., "Considerations in the Process Design of Nutrient Removal Activated Sludge Processes," Water Science and Technology, 1983, pp. 283-318, vol. 15, IAWPRC/Pergamon Press Ltd.
Frolund et al., "Extraction of Extracellular Polymers from Activated Sludge Using a Cation Exchange Resin," Water Research, 1996, vol. 30, No. 8, pp. 1749-1758, Elsevier Science Ltd.
"GAC Fluid Bed Efficient, economical bioremediation of BTEX groundwater" brochure by Envirex Inc., Dec. 1992.
Hartree, "Determination of Protein: A Modification of the Lowry Method that Gives a Linear Photometric Response," Analytical Biochemistry, 1972, vol. 48, pp. 422-427, Academic Press, Inc.
Harrison et al., "Transient Responses of Facultatively Anaerobic Bacteria Growing in Chemostat Culture to a Change from Anaerobic to Aerobic Conditions," Journal of General Microbiology, 1971, pp. 45-52, vol. 68.
Higgins et al., "Characterization of Exocellular Protein and Its Role in Bioflocculation," Journal of Environmental Engineering, 1997, vol. 123, pp. 479-485.
Higgins et al., "The Effect of Cations on the Settling and Dewatering of Activated Sludges: Laboratory Results," Water Environment Research, 1997, vol. 69, No. 2, pp. 215-224.
Holbrook et al., "A Comparison of Membrane Bioreactor and Conventional-Activated-Sludge Mixed Liquor and Biosolids Characteristics," Water Environment Research, 2005, vol. 77, No. 4, pp. 323-330.
Hong et al., "Biological Phosphorus and Nitrogen Removal Via the A/O Process: Recent Experience in the United States and United Kingdom," Water Science and Technology, 1984, pp. 151-172, vol. 16, Vienna, Austria.
"Internally-fed Rotary Wedgewire Screens" brochure by Parkson Corporation for Hycor® Rotoshear® (year not provided).
Kakii et al., "Effect of Calcium Ion on Sludge Characteristics," J. Ferment. Technol., 1985, vol. 63, No. 3, pp. 263-270.
Kim et al., pH and Oxidation-Reduction Potential Control Strategy for Optimization of Nitrogen Removal in an Alternating Aerobic-Anoxic System, Water Environment Research, vol. 73, No. 1, 2001.
Klopping et al., "Activated Sludge Microbiology, Filamentous and Non-Filamentous Microbiological Problems and Biological Nutrient Removal," Water Environment Federation, Plant Operations Specialty Conference, Date Unknown.
Low et al., "The Use of Chemical Uncouplers for Reducing Biomass Production During Biodegradation," Water Science and Technology, 1998, pp. 399-402, vol. 37, No. 4-5, Elsevier Science Ltd./Pergamon.
Lowry et al., "Protein Measurement with the Folin Phenol Reagent," J. Bio. Chem., 1951, vol. 193, pp. 265-275.
Mahmoud et al., "Anaerobic Stabilisation and Conversion of Biopolymers in Primary Sludge-Effect of Temperature and Sludge Retention Time," Water Research, 2004, vol. 38, pp. 983-991, Elsevier Ltd.
Marais et al., "Observations Supporting Phosphate Removal by Biological Excess Uptake-A Review," Water Science and Technology, 1983, pp. 15-41, vol. 15, IAWPRC/Pergamon Press Ltd.
Mavinic et al., "Fate of Nitrogen in Aerobic Sludge Digestion," J. Water Pollut. Control Fed., 1982, vol. 54, No. 4, pp. 352-360.
Moen et al., "Effect of Solids Retention Time on the Performance of Thermophilic and Mesophilic Digestion of Combined Municipal Wastewater Sludges," Water Environment Research, 2003, vol. 75, No. 6, pp. 539-548.
Murthy et al., "Factors Affecting Floc Properties During Aerobic Digestion: Implications for Dewatering," Water Environment Research, 1999, vol. 71, No. 2, pp. 197-202.
Murthy et al., "Optimizing Dewatering of Biosolids from Autothermal Thermophilic Aerobic Digesters (ATAD) Using Inorganic Conditioners," Water Environment Research, 2000, vol. 72, No. 6, pp. 714-721.
Nielsen et al., "Changes in the Composition of Extracellular Polymeric Substances in Activated Sludge During Anaerobic Storage," Appl. Microbiol. Biotechnol., 1996, vol. 44, pp. 823-830, Springer-Verlag.
Novak et al., "Mechanisms of Floc Destruction During Anaerobic and Aerobic Digestion and the Effect on Conditioning and Dewatering of Biosolids," Water Research, 2003, vol. 37, pp. 3136-3144, Elsevier Science Ltd.
Park et al., "The Digestibility of Waste Activated Sludges," Water Environment Research, 2006, vol. 78, No. 1, pp. 59-68.
Park et al., "The Effect of Wastewater Cations on Activated Sludge Characteristics: Effects of Aluminum and Iron in Floc," Water Environment Research, 2006, vol. 78, No. 1, pp. 31-40.
Euro-Matic, "Hollow Plastic Balls for Industrial Applications," Sep. 10, 2004, (7 pages), http://www.euro-matic.com/hollow.html.
International Search Report dated Jun. 2, 2009 from PCT Application No. PCT/US09/01949 (WO 2009/120384).
Ra et al., "Biological Nutrient Removal with an Internal Organic Carbon Source in Piggery Wastewater Treatment," Water Research, vol. 34, No. 3, pp. 965-973, 2000.
Rasmussen et al., "Iron Reduction in Activated Sludge Measured with Different Extraction Techniques," Water Research, 1996, vol. 30, No. 3, pp. 551-558, Elsevier Science Ltd.
"Rex VLR/SCC System" brochure by Envirex Inc., Bulletin No. 315-156, Oct. 1989.
"The RotoscreenTM Escalating Fine Channel Screen Builds Pre-Coat to Provide High Solids Capture Rates with the Lowest Headloss," Jul. 29, 2005, p. 1 of 2-page screen, Parkson Corporation Web Home Page, http://www.parkson.com/Content.aspx?ntopicid=120&parent=process&processID=148.
"The Rotoshear® Internalling Fed Rotating Drum Screen's Wedgewire Construction Maximizes Capture for Efficient Screening with Minimal Operator Attention," Jul. 29, 2005, p. 1 of 2-page screen, Parkson Corporation Web Home page, http://www.parkson.com/Content.aspx?ntopicid=133&parent=municipal&processID=149.
Strand et al., "Activated-Sludge Yield Reduction Using Chemical Uncouplers," Water Environment Research, 1999, pp. 454-458, vol. 71, No. 4.
Usfilter, "Aerator Products Aqua-Lator DDM Direct Drive Mixers," 2001, pp. 4.
Usfilter, "Aerator Products Aqua-Lator High Speed Surface Aerators," 1999, pp. 2-15.
Urbain et al., "Bioflocculation in Activated Sludge: An Analytic Approach," Water Research, 1993, vol. 27, No. 5, pp. 829-838, Pergamon Press Ltd.

(56) References Cited

OTHER PUBLICATIONS

U.S. Environmental Protection Agency, "Acid Digestion of Sediments, Sludges, and Soils," U.S. EPA Method 3050B, 1996, pp. 1-12.

Van Loosdrecht et al., "Maintenance, Endogenous Respiration, Lysis, Decay and Predation," Water Science and Technology, 1999, pp. 107-117, vol. 39, No. 1, IAWQ/Elsevier Science Ltd../Pergamon.

"Vertical loop reactors—fine bubble power efficiency without fine bubble maintenance" brochure by Envirex Inc., Jan. 1986.

Westgarth, et al., "Anaerobiosis in the Activated-Sludge Process," (paper presentation and formal discussions) Department of Environmental Sciences and Engineering, School of Public Health, University of North Carolina, Chapel Hill, pp. 43-61 (neither publication information nor year provided).

Yasui et al., "An Innovative Approach to Reduce Excess Sludge Production in the Activated Sludge Process," Water Science and Technology, 1995, pp. 11-20, vol. 30, No. 9, IAWQ/Pergamon.

Yasui et al., "A Full-Scale Operation of a Novel Activated Sludge Process Without Excess Sludge Production," Water Science and Technology, 1996, pp. 395-404, vol. 34, No. 3-4, Elsevier Science Ltd., Pergamon.

Ng, How, et al., "Membrane bioreactor operation at short solids retention times: performance and biomass characteristics," Water Research 39 (2005), pp. 981-992.

Chinese Third Office Action and Search Report corresponding CN200980111277.9, dated Aug. 12, 2013.

\* cited by examiner

HYBRID AEROBIC AND ANAEROBIC WASTEWATER AND SLUDGE TREATMENT SYSTEMS AND METHODS

CROSS-REFERENCE TO RELATED APPLICATIONS

This application claims the benefit of U.S. Provisional Application No. 61/040,179, filed Mar. 28, 2008, entitled GREEN WASTEWATER TREATMENT PROCESS; U.S. Provisional Application No. 61/041,720, filed Apr. 2, 2008, entitled HYBRID PROCESS TO CONVERT ANAEROBIC WASTEWATER TREATMENT TO ANAEROBIC SLUDGE TREATMENT; and U.S. Provisional Application No. 61/046,631, filed Apr. 21, 2008, entitled MINIMIZING ENERGY USAGE BY APPLYING HYBRID ANAEROBIC DIGESTION FOR WATER RECLAMATION, each of which is incorporated herein by reference for all purposes.

BACKGROUND OF THE INVENTION

1. Field of the Invention

The present invention relates to systems and processes of wastewater treatment and, in particular, to systems and methods of treating wastewater utilizing biological sorption, aerobic treatment, anaerobic sludge digestion, sequencing batch reactors with membrane filtration systems.

2. Description of the Related Art

Pilgram et al., in U.S. Pat. No. 6,383,389, which is incorporated herein by reference for all purposes, including but not limited to sequences or stages that can be used in batch or continuous reactors, teach a wastewater treatment system and method of controlling the treatment system. A control system can sequence and supervise treatment steps in a batch flow mode of operation or a continuous flow mode.

Sutton, in U.S. Patent Application No. 2008/0223783, teaches a wastewater treatment system and a method of treating wastewater. The system includes an aerobic membrane bioreactor and an anaerobic digester system connected to receive wasted solids continuously from the aerobic membrane bioreactor. The system also returns effluent from the anaerobic digester system continuously to the aerobic membrane bioreactor.

SUMMARY OF THE INVENTION

One or more aspects of the present disclosure involve embodiments directed to a process for treating wastewater and sludge. The process can comprise providing a wastewater to be treated; promoting biological sorption of the wastewater to be treated to produce a first mixed liquor; producing a solids-rich sludge and a solids-lean portion from the mixed liquor; aerobically treating a first portion of the solids-rich sludge to produce an at least partially aerobically treated sludge; anaerobically digesting a second portion of the solids-rich sludge to produce an anaerobically digested sludge; combining at least a portion of the at least partially aerobically treated sludge with the wastewater to be treated; and combining at least a portion of the anaerobically digested sludge with the wastewater to be treated.

One or more further aspects of the present disclosure are directed to a process for treating wastewater comprising providing a wastewater stream to be treated; introducing the wastewater stream into a biological sorption tank to produce a first mixed liquor stream; introducing the mixed liquor stream into a separator to produce a solids-rich stream and a solids-lean stream; introducing at least a portion of the solids-rich stream into an aerobic treating tank to produce an at least partially aerobically treated sludge stream; introducing at least a portion of the solids-rich stream into an anaerobic digester to produce an anaerobically digested sludge stream; introducing at least a portion of the at least partially aerobically treated sludge stream into the biological sorption tank; and introducing at least a portion of the anaerobically digested sludge stream into the biological sorption tank.

One or more further aspects of the present disclosure are directed to a wastewater treatment system comprising a source of a wastewater to be treated; a biological sorption tank having a sorption tank inlet fluidly connected to the source of the wastewater; a separator fluidly having a separator inlet fluidly connected downstream from the biological sorption tank, a sludge outlet, and a solids-lean outlet; an aerobic treatment tank having an aerobic tank inlet fluidly connected downstream from the sludge outlet, and an at least partially aerobically treated sludge outlet fluidly connected to the sorption tank inlet; and an anaerobic digester having a digester inlet fluidly connected downstream from the sludge outlet, and a digested sludge outlet fluidly connected upstream of the sorption tank inlet.

One or more further aspects of the present disclosure are directed to a wastewater treatment system comprising a source of wastewater to be treated; a sequencing batch reactor having a basin with a basin inlet fluidly connectable to the source of the wastewater, an aeration system, a sludge collection system with a sludge outlet, and a decanting system with a supernatant outlet; an anaerobic digester having a digester inlet fluidly connectable downstream from the sludge outlet, and a digested sludge outlet fluidly connectable to the basin inlet; and a controller configured to generate a first output signal that provides fluid communication between the basin inlet and the source of wastewater, and a second signal that provides fluid communication between the sludge outlet and the digester inlet.

One or more further aspects of the present disclosure are directed to a wastewater treatment system comprising a source of wastewater to be treated; a biological treatment train fluidly connected to the source of wastewater to be treated, the first treatment train comprising at least one biological reactor selected from the group consisting of an anaerobic reactor, an anoxic reactor, and an aerobic reactor; an anaerobic digester fluidly connected downstream from a solids-rich waste outlet of the biological treatment train; and a digested anaerobic sludge recycle line fluidly connecting a digested sludge outlet of the anaerobic digester and an inlet of the at least one biological reactor.

One or more further aspects of the present disclosure are directed to a method of facilitating wastewater treatment in a wastewater treatment system having a biological treatment train with at least one biological reactor selected from the group consisting of an anaerobic reactor, an anoxic reactor, and an aerobic reactor. The method can comprise fluidly connecting a solids-rich outlet of the biological treatment train upstream of an inlet of an anaerobic digester; and fluidly connecting a digested sludge outlet of the anaerobic digester upstream of an inlet of the at least one biological reactor.

BRIEF DESCRIPTION OF THE DRAWINGS

The accompanying drawings are not intended to be drawn to scale. The identical or nearly identical component or feature that is illustrated in various figures is represented by a like numeral. For purposes of clarity, not every component may be labeled in every drawing, nor is every component of each embodiment of the invention shown where illustration is not necessary to allow those of ordinary skill in the art to understand the invention. In the drawings.

DETAILED DESCRIPTION OF THE INVENTION

Figure 1:
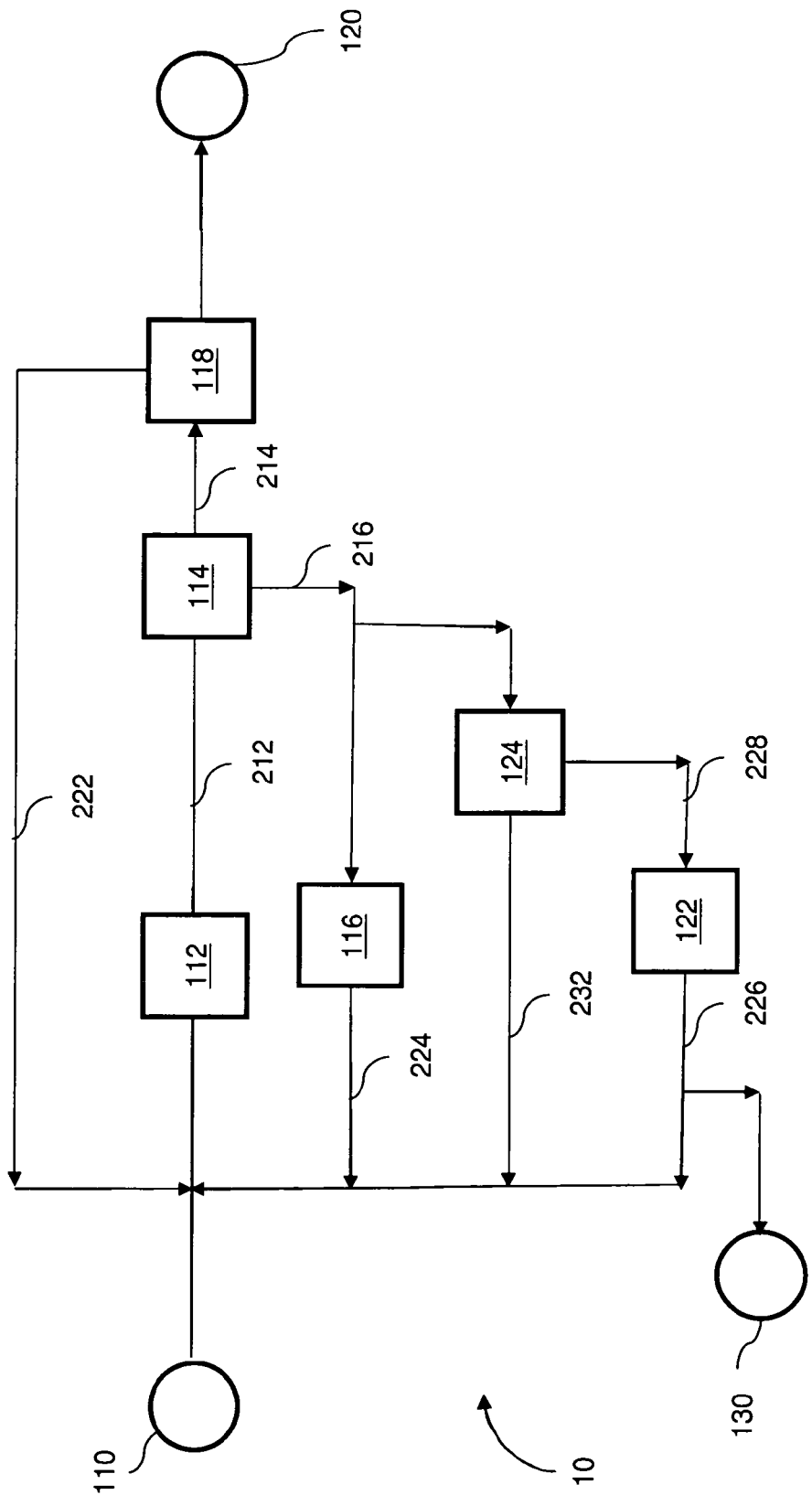
FIG. 1 is a flow diagram illustrating a representative treatment system pertinent to one or more aspects of the invention.

This invention is directed to systems and methods of treating water, wastewater or sludge to, for example, reduce oxygen demand, such as the biological oxygen demand (BOD), and render the water suitable for secondary uses or discharge to the environment. One or more aspects of the invention relate to wastewater treatment systems and methods of operation and facilitating thereof. Further aspects can pertain to generating, or collecting a byproduct such as an off-gas and utilizing the byproduct as a fuel source for one or more unit operations of the treatment system. The invention is not limited in its application to the details of construction and the arrangement of components, systems, or subsystems set forth herein, and is capable of being practiced or of being carried out in various ways. Typically, the water to be treated, such as wastewater or a wastewater stream, contains waste matter which, in some cases, can comprise solids and soluble and insoluble organic and inorganic material. Prior to discharge to the environment, such streams may require treatment to decontaminate or at least partially render the wastewater streams benign or at least satisfactory for discharge under established regulatory requirements or guidelines. For example, the water can be treated to reduce its BOD or other characteristic such as *Giardia* content to within acceptable limits.

Some aspects of the invention can involve biologically treating wastewater by promoting bacterial digestion of biodegradable material of at least a portion of at least one species in the wastewater. Further aspects of the invention can relate to effecting or at least facilitating separation of converted, digested biodegraded solid material from the entraining liquid. Still further aspects of the invention can relate to effecting or at least facilitating reducing an amount of solids from the wastewater.

The invention is directed to systems and methods for treating water to, for example, reduce oxygen demand, such as the biological oxygen demand (BOD) and the chemical oxygen demand (COD), and render the water suitable for secondary uses or discharge to the environment. One or more aspects of the invention relate to wastewater treatment systems and methods of operation thereof. The invention is not limited in its application to the details of construction and the arrangement of components, systems, or subsystems set forth herein, and is capable of being practiced or of being carried out in various ways.

Typically, the water to be treated, such as wastewater or a wastewater stream, contains waste matter which, in some cases, can comprise solids and soluble and insoluble organic and inorganic material. Prior to discharge to the environment, such streams may require treatment to decontaminate or at least partially render the wastewater streams benign or at least satisfactory for discharge under established regulatory requirements or guidelines. For example, the wastewater can be treated to reduce its COD or BOD to within acceptable limits.

Some aspects of the invention can involve biologically treating wastewater by promoting bacterial digestion of biodegradable material of at least one species in the wastewater. Further aspects of the invention can relate to effecting or at least facilitating separation of converted, digested biodegraded solid material from the entraining liquid. Still further aspects of the invention can relate to effecting or at least facilitating reducing an amount of solids from the wastewater.

As used herein, the terms "water," "wastewater," and "wastewater stream" refer to water to be treated such as streams or bodies of water from residential, commercial, or municipal, industrial, and agricultural sources, as well as mixtures thereof, that typically contain at least one undesirable species, or pollutant, comprised of biodegradable, inorganic or organic, materials which can be decomposed or converted by biological processes into environmentally benign or at least less objectionable compounds. The water to be treated can also contain biological solids, inert materials, organic compounds, including recalcitrant or a class of compounds that are difficult to biodegrade relative to other organic compounds as well as constituents from ancillary treatment operations such as, but not limited to nitrosamines and endocrine disruptors.

A "solids-lean" portion is typically water having less suspended solids relative to a starting mixed liquor after one or more settling or separation operations. Conversely, a "solids-rich" sludge is typically water having a higher solids concentration relative to the starting mixed liquor after one or more settling or separation operations. For example, a mixed liquor having suspended solids can be allowed to promote settling of at least a portion of the solids suspended therein; the resultant water body, as a consequence of artificially induced or natural gravitational forces will typically have a lower water layer and an upper water layer, wherein the lower layer has a higher concentration of solids, relative to the starting mixed liquor and to the upper, solids-lean water layer. Further, the solids-lean water layer will typically have a lower concentration of solids suspended therein relative to the starting mixed liquor. Other separation operations can involve filtration to produce the solids-rich sludge and the solids-lean portion.

A "treated" portion is typically water having less undesirable species or pollutants relative to a starting "solids-lean" portion after one or more treatment stages, such as one or more biological or separation operations. A "solids-lean" portion having undesirable species such as soluble inorganic or organic compounds can be introduced to a membrane filtration device or a membrane bioreactor that may retain the inorganic or organic compounds on a first side of a filter as a "second mixed liquor," while allowing the "treated" portion to pass through the filter.

One or more of the inventive systems disclosed herein can comprise one or more biologically-based or non-biologically-based unit operations. The systems and techniques of the invention can be effected as, or at least as a portion, of decontamination or treatment systems that typically include one or more of pre-treatment, primary treatment, secondary treatment, and post-treatment or polishing operations. Further, the treatment facilities that can employ one or more aspects of the invention can include at least one of the pre-treatment, primary treatment, secondary treatment, and post-treatment or polishing operations.

Pretreatment systems and operations may remove grit, sand, and gravel. Primary treatment operations or systems can involve at least partial equalization, neutralization, and or removal of large insoluble material of the water to be treated such as, but not limited to fats, oils, and grease. The pretreatment and primary treatment operations may be combined to remove such materials as well as settleable solids and floating bodies, and insoluble objects such as rags and sticks. Primary clarifiers may be utilized to separate solids.

Secondary treatment unit operations or systems can involve biological treatment such as those that typically employ a biomass with bacteria or a consortium of microorganisms to at least partially hydrolyze or convert biodegradable material such as, but not limited to sugar, fat, organic molecules, and compounds that create an oxygen demand in the water. Indeed some advantageous aspects of the invention can utilize biological processes and systems to remove or convert at least a portion of organic material in the water to be treated.

Post-treatment or polishing operations or systems can include biological treatments, chemical treatments, and separation systems. The post-treatment operations may include processes that involve biological nitrification/denitrification and phosphorus removal. Chemical treatments that can be used may include chemical oxidation and chemical precipitation. Separation systems can include dissolved inorganic solids removal by ion exchange, ultrafiltration, reverse osmosis, or electrodialysis. Further treatment processes can involve disinfection, decontamination or inactivation of at least a portion of any residual microorganisms by chemical or physical means. For example, disinfection can be effected by exposure to any one or more of oxidizing agents or to actinic radiation. Commercially available filtration systems that may be utilized in some embodiments of the invention include those employing the CMF-S™ continuous membrane filtration modules as well as the MEMCOR® CMF (Pressurized) XP, CP, and XS membrane filtration systems, from Siemens Water Technologies Corp. Other separators that can be used include filter presses and centrifuges.

Some embodiments of the treatment systems of the invention can comprise a source of wastewater to be treated, a biological sorption tank having a sorption tank inlet fluidly connected to the source of the wastewater. The treatment systems of the invention can also comprise a separator fluidly having a separator inlet fluidly connected downstream from the biological sorption tank, a sludge outlet, and a solids-lean outlet. The treatment systems of the invention can further comprise an aerobic treatment tank having an aerobic tank inlet fluidly connected downstream from the sludge outlet, and an at least partially aerobically treated sludge outlet fluidly connected to the sorption tank inlet. The treatment systems of the invention can additionally comprise an anaerobic digester having a digester inlet fluidly connected downstream from the sludge outlet, and a digested sludge outlet fluidly connected upstream of the sorption tank inlet.

Non-limiting examples of clarifiers or components thereof that can be utilized in one or more configurations of the present treatment systems includes but is not limited to the ENVIREX® FLOC-CLARIFIER system, the SPIRA-CONE™ upflow sludge blanket clarifier, RIM-FLO® circular clarifier, and the TRANS-FLO® clarifier, from Siemens Water Technologies Corp.

Membrane bioreactor (MBR) systems that can be utilized in accordance with one or more configurations disclosed herein include, but are not limited to, the MEMPULSE™ membrane bioreactor system, the PETRO™ membrane bioreactor system, the Immersed Membrane Bioreactor System, and the XPRESS™ MBR Packaged Wastewater system, from Siemens Water Technologies Corp.

Non-limiting examples of components or portions of the anaerobic systems that can be utilized in one or more configurations of the wastewater systems include, but are not limited to, the DYSTOR® digester gas holder system, the CROWN® disintegration system, the PEARTH® digester gas mixing system, the PFT® spiral guided digester gas holder, the PFT® vertical guided digester holder, the DUO-DECK™ floating digester cover, the PFT® heater and heat exchanger system, from Siemens Water Technologies Corp.

One or more embodiments pertinent to some aspects of the invention can involve a wastewater treatment system comprising a source of wastewater to be treated and a sequencing batch reactor having a basin with a basin inlet fluidly connectable to the source of the wastewater, an aeration system, a sludge collection system with a sludge outlet, and a decanting system with a supernatant outlet. The wastewater treatment system can also comprise an anaerobic digester having a digester inlet fluidly connectable downstream from the sludge outlet, and a digested sludge outlet fluidly connectable to the basin inlet, and a controller configured to generate a first output signal that provides fluid communication between the basin inlet and the source of wastewater, and a second signal that provides fluid communication between the sludge outlet and the digester inlet.

In still further embodiments of the invention, the method and techniques of the invention can comprise providing a wastewater to be treated and promoting biological sorption of the wastewater to be treated to produce a first mixed liquor. The method and techniques of the invention can further comprise producing a solids-rich sludge and a solids-lean portion from the mixed liquor, and aerobically treating a first portion of the solids-rich sludge to produce an at least partially aerobically treated sludge. A second portion of the solids-rich sludge can be anaerobically digested to produce an anaerobically digested sludge. The method and techniques of the invention can even further comprise combining at least a portion of the at least partially aerobically treated sludge with the wastewater to be treated, and combining at least a portion of the anaerobically digested sludge with the wastewater to be treated.

In still further embodiments of the invention, the method and techniques of the invention can comprise providing a wastewater stream to be treated, and introducing the wastewater stream into a biological sorption tank to produce a first mixed liquor stream. The method and techniques of the invention can also comprise introducing the mixed liquor stream into a separator to produce a solids-rich stream and a solids-lean stream. The method and techniques of the invention may even further comprise introducing at least a portion of the solids-rich stream into an aerobic treating tank to produce an at least partially aerobically treated stream. Even further, the method and techniques of the invention can comprise at least a portion of the solids-rich stream into an anaerobic digester to produce an anaerobically digested sludge stream. Still further, the method and techniques of the invention can comprise introducing at least a portion of the at least partially aerobically treated sludge stream into the biological sorption tank, and introducing at least a portion of the anaerobically digested sludge stream into the biological sorption tank.

One or more embodiments pertinent to some aspects of the invention can involve a wastewater treatment system comprising a source of wastewater to be treated and a biological treatment train fluidly connected to the source of wastewater to be treated. The first treatment train can comprise at least one biological reactor selected from the group consisting of an anaerobic reactor, an anoxic reactor, and an aerobic reactor. The wastewater treatment system can also comprise an anaerobic digester fluidly connected downstream from a solids-rich outlet of the biological treatment train and a digested anaerobic sludge recycle line fluidly connecting a digested sludge outlet of the anaerobic digester and an inlet of the at least one biological reactor.

In still further embodiments of the invention, the method and techniques of the invention can comprise a method of facilitating wastewater treatment in a wastewater treatment system having a biological treatment train with at least one biological reactor selected from the group consisting of an anaerobic reactor, an anoxic reactor, and an aerobic reactor. The method can comprise fluidly connecting a solids-rich outlet of the biological treatment train upstream of an inlet of an anaerobic digester, and fluidly connecting a digested sludge outlet of the anaerobic digester upstream of an inlet of the at least one biological reactor.

The systems and components of the invention may also provide cost advantages relative to other wastewater treatment systems through use of biological processes in combination with anaerobic digestion. The wastewater treatment process of the present invention can reduce sludge production through the use of various unit operations including biological processes and recycle streams. The wastewater treatment process also overcomes some of the technical difficulties associated with use of anaerobic wastewater treatment processes, by, for example, concentrating or strengthening the sludge introduced into the anaerobic digester. Additionally, costs associated with use of a conventional aerobic stabilization unit are typically reduced because less aeration would typically be required in the aerobic processes due to the use of the anaerobic digester and various recycle streams. This process can also generate methane as a product of the anaerobic digestion process, which can be used as an energy source. In certain embodiments, a large portion of the chemical oxygen demand (COD) and biological oxygen demand (BOD) can be reduced using the anaerobic digester. This can reduce the aeration and oxygen requirements, and thus, operation costs, and increase the amount of methane produced that can be used as an energy source. Additionally because anaerobic digestion will be used to reduce COD and BOD in the sludge, the system sludge yield can also be reduced.

In contrast to conventional contact stabilization processes, wherein the sludge stabilization is performed in aerobic sludge stabilization tanks with retention times of a few hours such as between one and two hours, one or more of the present treatment systems can utilize a plurality of sub-trains and one or more sorption systems that facilitate assimilation or biological sorption of suspended and/or dissolved materials. For example, the various systems and techniques disclosed herein can advantageously provide wastewater treatment by utilizing a plurality of sub-trains that have varied hydraulic loadings. A first train can have a majority of the return activated sludge, preferably anaerobically digested, and second train having fraction of the activated sludge aerobically treated, typically only partially aerobically treated by exposure to aerobic activity for less than full conversion or consumption of all oxygen demand. Various configuration of the present systems can utilize solids/liquids separators that further reduce the capital requirements. Thus, in some cases, one or more separators can be utilized to separate sludge or solids-rich streams to be treated in one or more of the sub-trains.

Some other embodiments of the treatment systems of the invention can comprise collecting and/or converting various materials to produce a sludge material. The biological sorption process can comprise both adsorption and absorption processes that facilitate conversion of at least a portion of dissolved solids as well as suspended solids in the water or wastewater. In the adsorption process, ions and molecules of particles physically adhere or bond onto the surface of another molecule or compound. For example, the adsorption process can comprise attaching compounds or molecules to surfaces of soluble and insoluble particles in the wastewater to cause them to settle in a downstream clarifier. In absorption processes, chemical and biochemical reactions can occur in which compounds or substances in one state are converted into another compound or substance in a different state. For example, compounds in the wastewater can be converted to another compound, or can be incorporated by or into bacteria for the purpose of growing new bacteria. Aeration can be provided to the biological sorption process to mix and to provide an aerobic environment. The retention time in a biological sorption tank can be between a few minutes and a few hours, for example, between about five minutes and two hours, more preferably between thirty minutes and one hour. Aeration therein can be effected to provide mixing and maintain an aerobic environment that facilitates flocculation. Further flocculation or aggregation can be effected in the systems that utilize an aerobic treatment tank. In some cases, however, the aerobic treatment tank provides substantially all the dissolved oxygen into the biological sorption tank.

In some cases, the treatment system can involve unit operations that have various consortia of microorganisms that facilitate rapid return to steady state conditions following an upset. For example, the treatment system can circulate microorganisms that provide or facilitate anaerobic digestive activity. In certain embodiments, the biological sorption tank is constantly seeded with nitrification bacteria (such as ammonia oxidizing and nitrite oxidizing biomass) which can survive the anaerobic digester and which can be recycled back to the aerobic environment. For example, nitrification and denitrification can take place in the biological sorption tank. In certain embodiments of the invention, sludge processed through an aerobic treatment and/or an anaerobic digester may also enter the biological sorption tank as a recycle stream to assist in the biological sorption processes. Other processed streams, such as a solids-lean portion or a sludge-lean portion exiting a thickener or clarifier, or a mixed liquor produced from a polishing unit can also be introduced as a recycle stream to the biological sorption tank to assist in the biological sorption process.

In other cases, some configurations can involve chemically facilitated sorption mechanisms.

Some embodiments of the treatment processes of the invention can comprise biologically treating at least a portion of the sludge from the wastewater to be treated. Biological treatment processes can be used to remove and/or biodegrade undesirable materials in the water to be treated, for example organic pollutants. In certain embodiments, the biological treatment processes can be aerobic biological treatment processes. Depending on the operating conditions, at least a portion of the organic material in the water to be treated or sludge can be oxidized biologically and converted to carbon dioxide and water. In certain embodiments, the reduction in oxygen demand can be as high as about 80-90%. In some embodiments, the a portion of the organic material in the water to be treated or sludge can be reduced only partially by utilizing a less than sufficient aeration rate or a less than sufficient residence time. For example, the reduction in oxygen demand can be less than 70%, less than 50%, less than 30%, or less than 10%. In particularly preferred embodiments, the reduction in oxygen demand can be less than 8%, and more preferably between about 0.08% to about 6%. The water to be treated or sludge can be aerated and mixed for a period of time in, for example, an open tank using air diffusers or aerators. Aerobic biological treatment processes can be performed to provide a dissolved oxygen content of 0.2 mg/L to 5 mg/L, more preferably 1.5 mg/L to 2.5 mg/L. Retention time in the aerobic treatment tank can be several weeks, more preferably, in a range of one to six hours, and even more preferably, in a range of one to two hours.

Some embodiments of the treatment systems of the invention can comprise a system capable of breaking down and/or converting various materials into other, more useful, end products. In this system, microorganisms can break down biodegradable material in the absence of oxygen. In this anaerobic digestion process, many organic materials can be processed, such as waste paper, grass clippings, food, sewage, and animal waste. This process has the advantage of providing volume and mass reduction of the sludge being introduced into the system. The process produces a methane and carbon dioxide rich biogas suitable for energy production. The anaerobic digestion process can comprise bacterial hydrolysis of the sludge being introduced into the digester. This can break down insoluble organic polymers such as carbohydrates into sugars, amino acids, and fatty acids. In certain anaerobic digesters, acidogenic bacteria can then convert these materials into carbonic acids, alcohols, hydrogen, carbon dioxide, ammonia, and organic acids. The compounds converted by the acidogenic bacteria can be further digested by acetogenic microorganisms to produce acetic acid, carbon dioxide, and hydrogen. Methanogenic bacteria or methanogens can then convert the carbon dioxide, hydrogen, ammonia, and organic acids to methane and carbon dioxide. The methane produced from this anaerobic digestion process can be used as an energy source. In certain embodiments, the anaerobic digester is constantly seed with a consortium of methanogens that reside in the sludge of the treatment process. Certain slow growing anaerobic bacteria such as acetoclastic methanogens and hydrogentrophic methanogens can survive in the aerobic environment of the present invention, and will return to the anaerobic digester allowing the anaerobic digester to be constantly seeded with a nontrivial level of methanogens. This allows for a more reliable treatment process, and allows for a smoother transition back to a steady state if a problem occurs within the system.

The anaerobic digestion process can be operated at temperatures between 20° C. and 75° C., depending on the types of bacteria utilized during digestion. For example, use of mesophilic bacteria typically requires operating temperatures between about 20° C. and 45° C., while thermophilic bacteria typically require operating temperatures of between about 50° C. and 75° C. In certain embodiments, the preferred operating temperature can be between about 25° C. and 35° C. to promote mesophilic activity rather than thermophilic activity. Depending on the other operating parameters, the retention time in an anaerobic digester can be between seven and fifty days retention time, and more preferably between fifteen and thirty days retention time. In certain embodiments, the reduction in oxygen demand can be 50%.

In certain embodiments, the sludge that is processed through the anaerobic digester may be recycled back to an inlet of a biological sorption process. Prior to recycling the anaerobically digested sludge into the biological sorption process, the anaerobic sludge may be processed through an aerobic condition tank to modify the characteristics of the anaerobically digested sludge. In certain embodiments, the anaerobically digested sludge may also be recycled back to the inlet of the aerobic treatment tank to combine with the solids-rich sludge entering the aerobic treatment tank.

Some other embodiments of the treatment system can comprise one or more systems capable of separation processes. The separation processes may separate certain portion of water to be treated or sludge. The separation processes may be capable of removing large materials from wastewater, for example, grit, sand, and gravel. Other separations processes can remove large insoluble material of the water to be treated such as, but not limited to fats, oils, and grease. Other separation systems may take advantage of the settling characteristics of materials, such as settleable solids and floating bodies. Various separations may employ unit operations such as settling tanks, clarifiers, thickeners, and filtration systems.

Some other embodiments of the treatment system can comprise one or more recycle streams that may deliver the output of a first unit operation to the inlet of a second unit operation upstream of the first. In certain embodiments, the output from an anaerobic digester, an aerobic digester, a sludge thickener, or an aerobic polishing unit can be recycled to the input of the primary clarifier or the biological sorption tank. In other embodiments, the output of an anaerobic digester can be recycled to the input of the aerobic treatment tank.

Some other embodiments of the treatment system can comprise a sequencing batch reactor that is fluidly connected to a source of wastewater to be treated. The sequencing bioreactor may biologically treat the wastewater by promoting degradation or conversion of biodegradable material, followed by settling and/or decanting the mixed liquor comprising the converted material. The sequencing batch reactor can be fluidly connected to an anaerobic digester located downstream from the reactor.

FIG. 1 exemplarily illustrates an embodiment in accordance with some aspects of the invention. The treatment system 10 can be fluidly connected or connectable to a source 110 of water to be treated. In accordance with any one of the aforementioned aspects of the invention, treatment system 10 can comprise one or more treatment unit operations, which may include one or more biological treatment processes and one or more solids-reducing and solids-collecting systems or processes.

Source 110 of water to be treated can be a water collection system from any one or more of a municipality, a residential community, and an industrial or a commercial facility, and an upstream pre-treatment system, or combinations thereof. For example, source 110 can be a sedimentation or settling tank receiving water from a sewer system.

Treatment system 10 can comprise one or more biological sorption tanks 112 that promote aggregation at least a portion of dissolved and suspended solids. Biological sorption tank 112 can comprise or is configured to contain a biomass of microorganisms that can metabolize biodegradable materials in the water to be treated. For example, biological sorption tank 112 can comprise or is configured to contain a biomass of microorganisms that process biodegradable materials in the water to be treated through absorption of the biodegradable materials. Biological sorption tank 112 can also comprise or is configured to contain substances or compounds for promotion of adsorption of soluble and insoluble material, such as organic compounds, in the wastewater. The biological sorption process may include aeration and mixing to help maintain the aerobic environment within biological sorption tank 112.

Biological sorption tank 112 produces first mixed liquor 212 which can be introduced into a separator such as clarifier 114 to produce solids-lean stream 214 and solids-rich sludge 216. Solids-lean stream 214 can be processed further, for example, to render the at least partially treated water suitable for discharge in a polishing unit 118 to produce treated product 120, which can be suitable for other uses, and also a second mixed liquor 222, which can be recycled back to source of wastewater 110.

Solids-rich sludge 216 can be divided allowing at least a portion of solids-rich sludge 216 to be aerobically treated in aerobic treatment tank 116 to produce an at least partially aerobically treated stream 224. At least partially aerobically treated stream 224 can be recycled back to source of wastewater to be treated 110, combined therewith, or introduced into other unit operations of the treatment system.

At least a portion of solids-rich sludge 216 can be introduced to anaerobic digester 122 to produce anaerobically digested sludge 226. A portion of anaerobically digested sludge 226 can be disposed of as waste sludge 130. A portion of anaerobically digested sludge 226 can also be recycled back to source of wastewater 110, combined therewith, or introduced into other unit operations of the treatment system.

Optionally, prior to introducing at least a portion of solids-rich sludge 216 to anaerobic digester 122, at least a portion of solids-rich sludge 216 can be introduced to a thickener 124 to produce a thickened sludge 228 and a sludge lean portion 232. Thickened sludge 228 can then be introduced into anaerobic digester 122 and sludge-lean portion 232 can be recycled back to source of wastewater 110, combined therewith, or introduced into other unit operations of the treatment system.

Any portion between zero and 100 percent of solids-rich sludge 216 can be introduced into aerobic treatment tank 116, the remainder being directed to the anaerobic digester. In certain examples, the portion introduced into thickener 124 or anaerobic digester 122 can be between about two and twenty percent of solids-rich sludge 216.

In certain examples, treated product 120 can be monitored for dissolved solids content, COD/BOD, or other identified characteristics. If the level of any one identified characteristic is not within a desired range or at a desired level, adjustments can be made to the treatment system. For example, if the COD of the treated product deviates from a desired level, a greater or lesser portion of anaerobically treated sludge 226 can be discharged as waste sludge 130.

Figure 2:
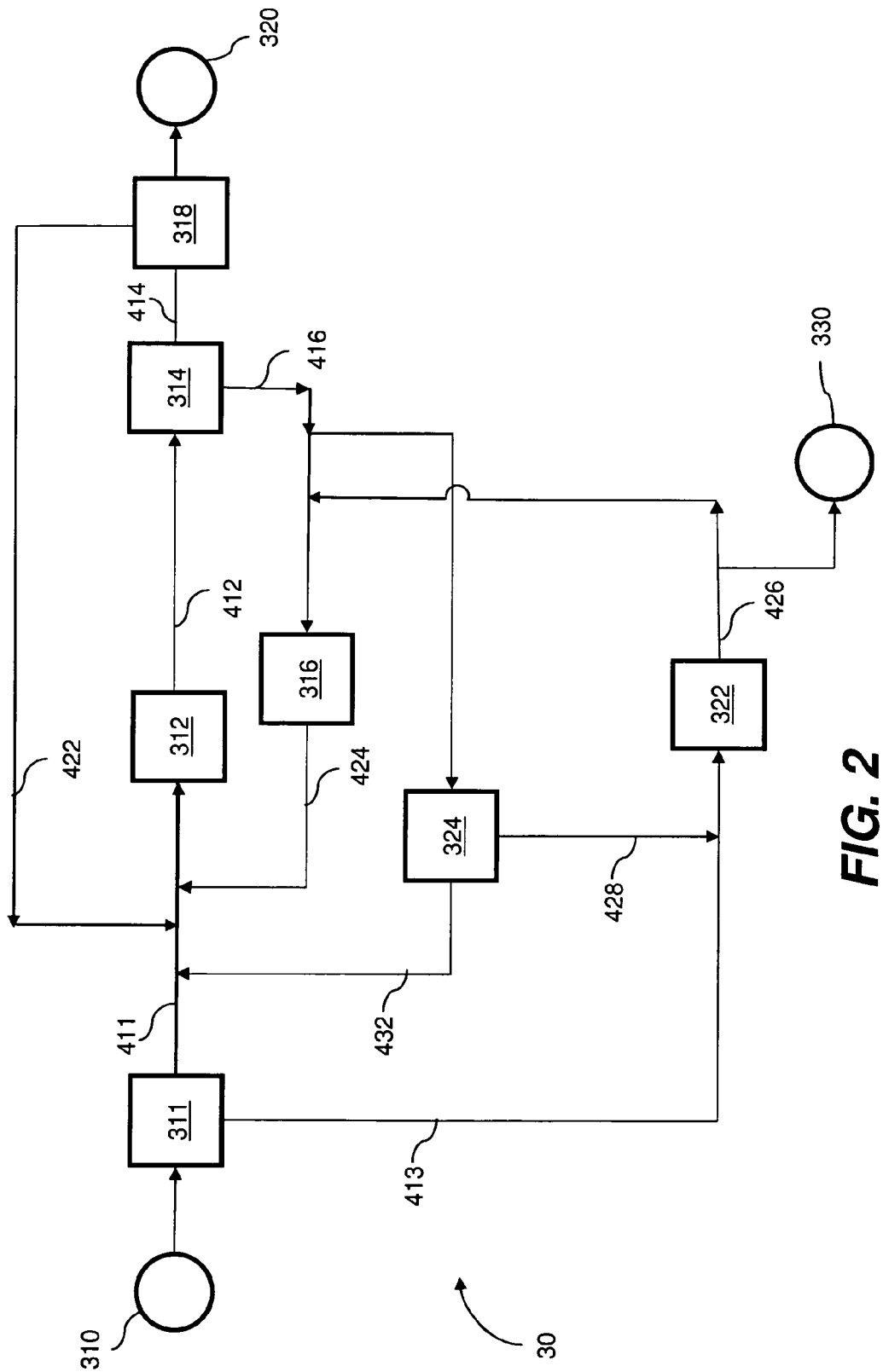
FIG. 2 is a flow diagram illustrating another representative treatment system pertinent to one or more aspects of the invention.

FIG. 2 exemplarily illustrates another embodiment in accordance with some aspects of the invention. The treatment system 30 can be fluidly connected to a source 310 of water to be treated. In accordance with any one of the aforementioned aspects of the invention, treatment system 30 can comprise one or more treatment unit operations, which may include one or more biological treatment processes and one or more solids-reducing and solids-collecting systems or processes.

System 30 can have one or more primary separators. For example, a primary clarifier 311 fluidly connected to a source 310 of water to be treated can be utilized to allow settling of at least a portion of components of source 310 of water to be treated so that solids-lean wastewater 411 can be produced and introduced to biological sorption tank 312. Primary clarifier 311 can also produce a solids-rich wastewater stream 413 which may be combined with a solids-rich sludge 416 or thickened sludge 428 to be introduced into an anaerobic digester 322, discussed in more detail below. The separators of the system that can be utilized, including but not limited to the primary separator, include filters and dissolve air flotation type units, with or without grit removal.

Solid-lean wastewater 411 is typically introduced into biological sorption tank 312 to produce first mixed liquor 412 which can be separated in a separation, such as clarifier 314, to produce solids-lean stream 414 and solids-rich sludge 416. Solids-lean stream 414 can be processed further, for example, a tertiary or post-treatment train with, for example, membrane bioreactor 318 to produce treated product 320 which can be suitable for other uses. A second mixed liquor 422 produced from membrane bioreactor 318 can be recycled back to be combined with solids-lean wastewater 411, or combined therewith or introduced into other unit operations of the treatment system.

Solids-rich stream 416 can be divided allowing at least a portion of solids-rich stream 416 to be aerobically treated in aerobic treatment tank 316 to produce at least partially aerobically treated stream 424. At least partially aerobically treated stream 424 can be recycled back to be combined with solids-lean wastewater 411.

At least a portion of solids-rich sludge 416 can be introduced to anaerobic digester 322 to produce anaerobically digested sludge 426. A portion of anaerobically digested sludge 426 can be disposed of as waste sludge 330. A portion of anaerobically digested sludge 426 can also be recycled back to be combined with solids-ridge sludge 416 to be introduced to aerobic treatment tank 316.

Prior to introducing at least a portion of solids-rich sludge 416 to anaerobic digester 322, at least a portion of solids-rich sludge 416 can be introduced to thickener 324 to produce thickened sludge 428 and sludge lean portion 432. Thickened sludge 428 can then be introduced into anaerobic digester 322 and sludge-lean portion 432 can be recycled back to be combined with solids-lean wastewater 411.

Any portion between zero and including 100 percent of solids-rich sludge 416 can be introduced into aerobic treatment tank 316, the remainder being directed to the anaerobic digester. In certain examples, the portion introduced into thickener 324 or anaerobic digester 322 can be between about 2 and 20 percent of solids-rich sludge 416. In some cases, however, a portion of solids-rich sludge 416 can be discharged as waste sludge 330.

In certain examples, treated product 320 can be monitored for dissolved solids content, COD/BOD, or other identified characteristics. If the level of any one identified characteristic is not within a desired range or at a desired level, adjustments can be made to the treatment system. For example, if the COD of treated product differs from a desired level, a greater or lesser portion of anaerobically treated sludge 426 can be discharged as waste sludge 330.

One or more nitrification units can be utilized. For example, a biofilm nitrification unit, which can be a moving bed bioreactor, can be disposed to receive at least a portion of the solids-lean stream from the separator. Effluent from the nitrification unit can be mixed with sludge from a clarifier to effect at least partial de-nitrification. Re-aeration can then be performed to remove at least a portion of nitrogen as a gas. Such variations can reduce or eliminate the use of external carbon sources.

Figure 3:
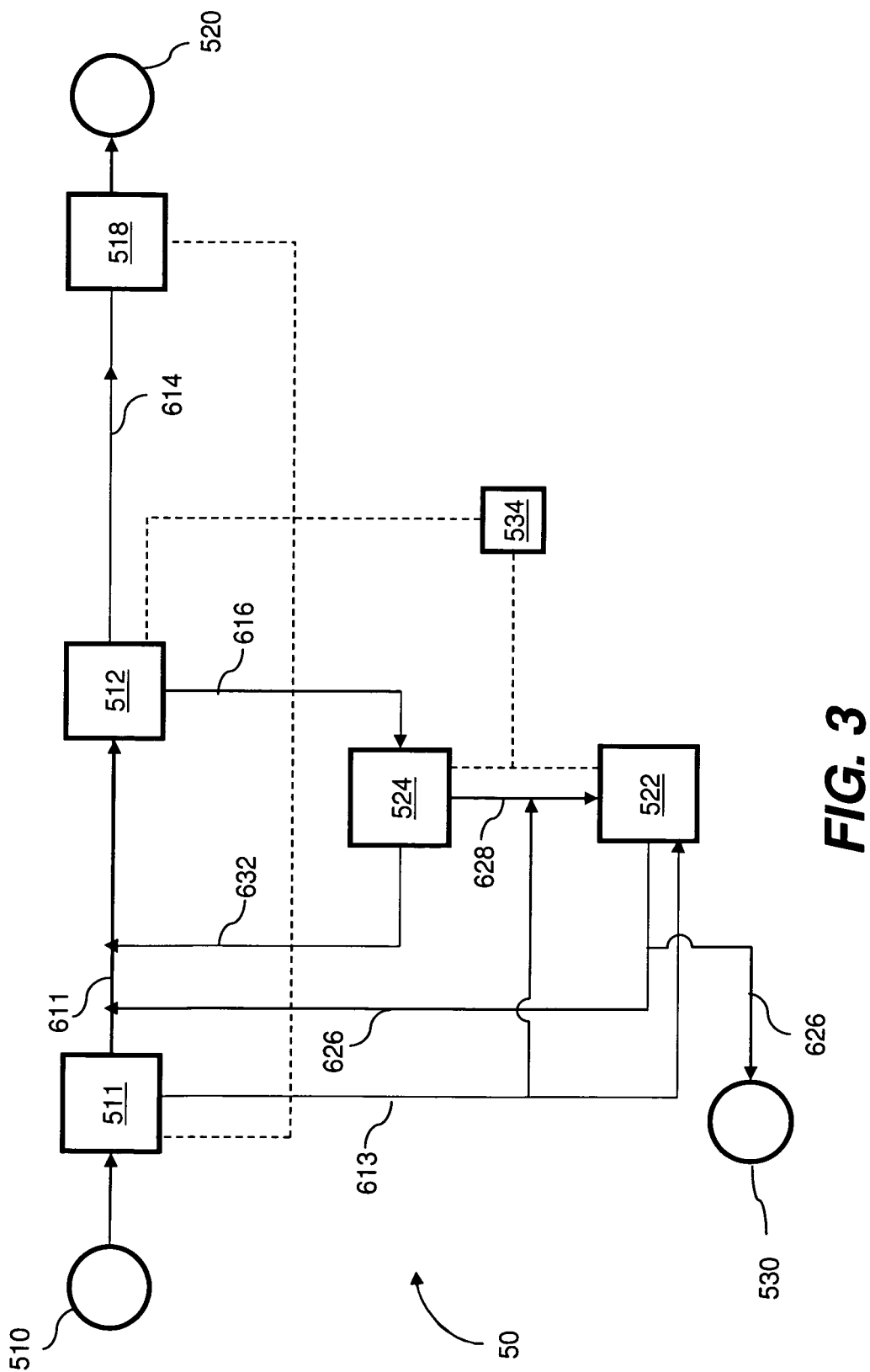
FIG. 3 is a flow diagram illustrating another representative treatment system pertinent to one or more aspects of the invention.
Figure 4:
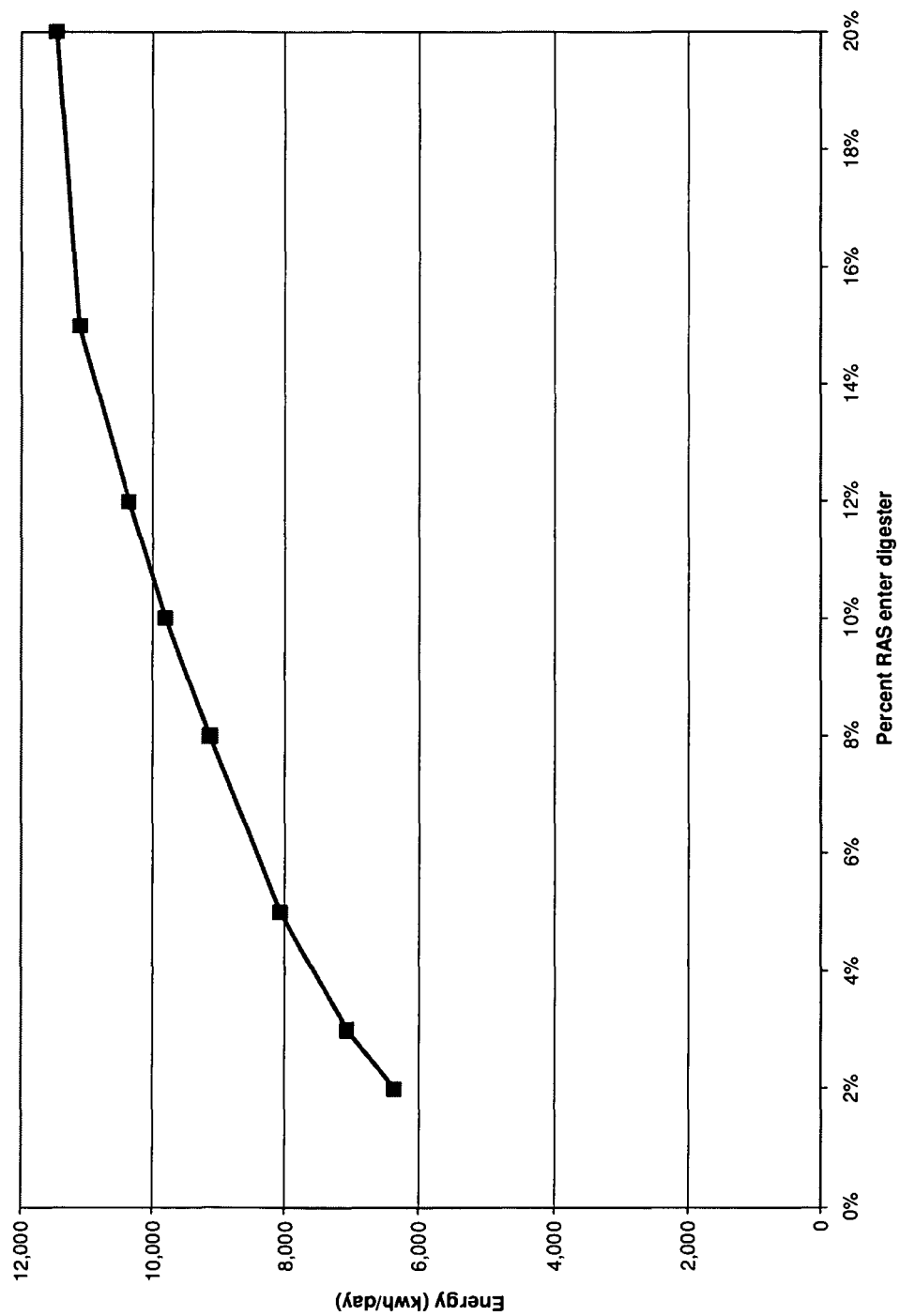
FIG. 4 is a graph of energy gain from methane production relative to the amount of activated sludge (percent) entering the anaerobic digester for a treatment system pertinent to one or more aspects of the invention.

FIG. 3 exemplarily illustrates another embodiment in accordance with some aspects of the invention. The treatment system 50 can be fluidly connected or connectable to a source 510 of water to be treated. In accordance with any one of the aforementioned aspects of the invention, treatment system 50 can comprise one or more treatment unit operations, which may include one or more biological treatment processes and one or more solids-reducing and solids-collecting systems or processes.

Optional primary clarifier 511 can be fluidly connected or connectable to source 510 of water to be treated. Primary clarifier 511 typically produces solids-lean wastewater 611 and solids-rich wastewater 613. At least a portion of solids-lean wastewater 611 can be introduced into one or more sequencing batch reactors 512, wherein one or more treatment steps can be performed. For example, sequencing batch reactor 512 can operate in one or more stages to treat the water or wastewater to be treated in a desired manner.

Sequencing batch reactor 512 can be operated or configured to receive the water to be treated from source 510 in a first stage, which is typically referred to as a FILL stage. The FILL stage can be performed in aerated, anoxic or a combination of aerated and anoxic conditions. Preferably, the influent water to be treated is introduced into a basin of sequencing batch reactor 512 through one or more influent distribution manifolds. The basin can be sized to accommodate or provide a desired hydraulic retention time and to accommodate the volume and incoming flow rate of water to be treated.

When the basin of sequencing batch reactor 512 is at least partially filled or thereafter, sequencing batch reactor 512 can be operated to favor bacterial metabolic activity that converts or treats at least a portion of biodegradable material in a second stage, which is typically referred to as a REACT stage. The REACT stage, which can be performed in one or more discrete steps or stages, can also be operated to perform other processes, such as biological sorption processes. In some cases, however, biological sorption may have been or be completed in the FILL stage. The REACT stage can be performed under aerobic conditions by introducing oxygen, preferably as air, from one or more air sources through aeration manifold submerged in the liquor. The one or more REACT stages, which can be performed, for example, after the FILL stage and/or after the DECANT stage, can be performed for a period sufficient to promote at least partial biodegradation or at least conversion, such as by biological sorption, for a period sufficient to promote adsorption and absorption of suspended particles and soluble material. For example, aeration can be performed through an aeration system in the basin to create aerobic conditions to facilitate oxidation of ammonia to nitrate by nitrification bacteria. An air source preferably further provides air released through aeration manifold of the aeration system as air bubbles in amounts sufficient to induce mixing of the liquor within the basin of sequencing batch reactor 512. Alternatively, or in conjunction with the aeration induced phenomena, mixing can also be effected by a mixer, such as an impeller, which may be advantageous when mixing is desired without introducing air into the liquor. The one or more REACT stages is not limited to the use of air and any source of oxygen that provides a target dissolved oxygen concentration in the liquor can be utilized for each or any of the one or more of REACT stages. The one or more REACT stages can include an aeration stage and a separate re-aeration stage that occurs at some period after the aeration stage.

A SETTLE stage typically follows the at least one aeration, biological sorption and/or mixing stages to create quiescent conditions that allow at least a portion of the biomass in the liquor to settle to form a supernatant, a solids-lean liquor and a solids-rich or sludge layer below the supernatant. The duration of the SETTLE stage may vary and depend on several factors including, but not limited to, the temperature of the mixed liquor and the nature and composition of the biomass.

Solids-lean liquor 614 can then be withdrawn or decanted in a DECANT stage and can be further treated in, for example, in polishing unit 518. At least a portion of the settled sludge can be withdrawn through a manifold and directed to further treatment by various biological processes or disinfection treatments. At least a portion of the solids-rich stream 616 can be withdrawn and introduced to various other biological processes, for example, aerobic treatment or anaerobic digestion 522. Withdrawal or decanting of the treated effluent or solids-lean liquor 614 can preferably be performed utilizing a decanting system in the basin and typically having a floating solids-excluding decanter or skimmer that is preferably constructed to have apertures that do not or at least reduces the likelihood of turbulent conditions that disturb the settled solids-rich layer during withdrawal of the solids-lean supernatant.

An IDLE stage may be optionally included during instances sequencing batch reactor 612 waits to receive influent to be treated.

In some instances, any of the functions or activities can be performed in more than one stage. For example, withdrawing solids-rich sludge 616 can be performed during the settling stage as well as during the idle stage. Thus, the invention can be practiced in other than the sequence of stages presented herein. Further, any or more stages can be omitted or combined. For example, in some cases, the REACT stage can be performed during the FILL stage thereby combining or extending the duration of the REACT stage.

The OMNIFLOW® sequencing batch reactor system from Siemens Water Technologies Corp., is an example of a commercially available treatment system that can comprise the biological train used to effect biological nutrient removal in accordance with some aspects of the invention. Further aspects of the invention may utilize the systems and methods disclosed by any of Calltharp and Calltharp et al. in U.S. Pat. Nos. 4,775,467, 5,021,161, and 6,884,354, each of which is incorporated herein by reference. Indeed, some advantageous features pertaining to constant level sequencing batch reactor systems may be utilized. Such constant level biological conversion systems may advantageously provide even further improved process control of the overall treatment system by reducing any operational fluctuations or variations during downstream filtration operations. Further advantages can, in some cases, reduce the size of any equalization tanks, or even eliminate the need for such unit operations, which reduces the overall treatment system footprint and capital requirements.

Sequencing the various stages may be facilitated by utilizing one or more controllers 534 operatively coupled to one or more sequencing batch reactors 512, primary clarifier 511, polishing unit 518, thickening unit 524, and anaerobic digester 522. One or more sensors are typically utilized in or with the one or more unit operations of sequencing batch reactor 512 to provide an indication or characteristic of the state or condition of processes during the treatment processes. For example, one or more level indicators (not shown) can be disposed in the basin of sequencing batch reactor 512 and configured to transmit to one or more controllers 534 a representation of the liquid level contained within the basin. Controller 534 can, based on the signals received from the one or more sensors, generate and send control signals to any of the components of primary clarifier 511, polishing unit 518, thickening unit 524, and anaerobic digester 522, or other components. For example, at a high liquid level condition in the basin, as measured by the one or more level indicators, controller 534 can generate and transmit a control signal to an actuator that closes an inlet valve fluidly isolating source 510 and the basin of sequencing batch reactor 512. Controller 534 typically further generates the control signals that initiates and terminates the stages of one or more sequencing batch reactors 512. For example, controller 534 can generate and transmit a control signal to energize or de-energize the air source for sequencing batch reactor 512.

Solids-lean stream 614 decanted from sequencing batch reactor 512 can be further treated in a polishing treatment system. For example, one or more configurations of the treatment systems disclosed herein can comprise one or more polishing units 518 using treatment processes including, but not limited to biological nitrification/denitrification and phosphorus removal, chemical oxidation, chemical precipitation, and separation systems including dissolved inorganic solids removal by ion exchange, ultrafiltration, reverse osmosis, ultraviolet radiation, or electrodialysis. Treated product 520 can be delivered to storage or secondary use, or discharged to the environment.

Solids-rich sludge 616 can be further processed in anaerobic digester 522 to produce anaerobically digested stream 626.

During operation of the treatment system, one or more target characteristics can be utilized to regulate one or more operating parameters of any of the unit operations of the system. A portion of anaerobically digested stream 626 can be recycled to be combined with source of wastewater to be treated 510 or solids-lean wastewater 611. A portion of anaerobically digested stream 626 can also be discarded from system 50 as waste sludge.

Optionally, prior to introducing at least a portion of solids-rich sludge 616 to anaerobic digester 522, at least a portion of solids-rich sludge 616 can be introduced to a thickener 524 to produce a thickened sludge 628 and a sludge lean portion 632. Thickened sludge 628 can then be introduced into anaerobic digester 522 and sludge-lean portion 632 can be recycled back to source of wastewater 510, solids-lean wastewater 611, combined therewith, or introduced into other unit operations of the treatment system.

The various systems and techniques disclosed herein can significantly reduce energy consumption, or even provide energy, and also reduce the amount of sludge produced during wastewater treatment.

Other unit operations such as filters and strainers may also be utilized.

Further, a controller can facilitate or regulate the operating parameters of the treatment system. For example, a controller may be configured to adjust a rate of recycle of the one or more streams, a duration of one or more residence times, a temperature, a dissolved oxygen concentration in a fluid in any of the unit operations of the treatment system.

The controller may respond to signals from timers (not shown) and or sensors (not shown) positioned at any particular location within the treatment system. For example, a sensor positioned in the anaerobic reactor may indicate less than optimum conditions therein. Further, the one or more sensors may monitor one or more operational parameters such as pressure, temperature, one or more characteristics of the liquor, and/or one or more characteristics of any of the effluent streams. Similarly, a sensor disposed in or otherwise positioned with any of the recycle streams can provide an indication of a flow rate thereof at, below, or above a desired or target rate. The controller may then respond by generating a control signal causing an increase or decrease in the recycle flow rate. The target recycle flow rate of the mixed liquor from the polishing sub-train may be dependent on an operating parameter of the treatment system. For example, the target recycle flow rate may be a multiple of, e.g., at least two times, the influent flow rate of the incoming water to be treated. In some cases, the solids discharge rate may be adjusted to achieve one or more target characteristics of the treated water. Other control scheme may involve proportionally varying the relative flow rates between the anaerobic digester and the aerobic treatment tank based at least partially on the oxygen demand of the influent or water to be treated.

The system and controller of one or more embodiments of the invention provide a versatile unit having multiple modes of operation, which can respond to multiple inputs to increase the efficiency of the wastewater treatment system.

The controller may be implemented using one or more computer systems which may be, for example, a general-purpose computer such as those based on in Intel PENTIUM®-type processor, a Motorola PowerPC® processor, a Hewlett-Packard PA-RISC® processor, a Sun UltraSPARC® processor, or any other type of processor or combination thereof. Alternatively, the computer system may include specially-programmed, special-purpose hardware, for example, an application-specific integrated circuit (ASIC) or controllers intended for water treatment systems.

The computer system can include one or more processors typically connected to one or more memory devices, which can comprise, for example, any one or more of a disk drive memory, a flash memory device, a RAM memory device, or other device for storing data. The memory is typically used for storing programs and data during operation of the system. For example, the memory may be used for storing historical data relating to the parameters over a period of time, as well as operating data. Software, including programming code that implements embodiments of the invention, can be stored on a computer readable and/or writeable nonvolatile recording medium, and then typically copied into memory wherein it can then be executed by one or more processors. Such programming code may be written in any of a plurality of programming languages, for example, Java, Visual Basic, C, C#, or C++, Fortran, Pascal, Eiffel, Basic, COBAL, or any of a variety of combinations thereof.

Components of the computer system may be coupled by one or more interconnection mechanisms, which may include one or more busses, e.g., between components that are integrated within a same device, and/or a network, e.g., between components that reside on separate discrete devices. The interconnection mechanism typically enables communications, e.g., data, instructions, to be exchanged between components of the system.

The computer system can also include one or more input devices, for example, a keyboard, mouse, trackball, microphone, touch screen, and other man-machine interface devices as well as one or more output devices, for example, a printing device, display screen, or speaker. In addition, the computer system may contain one or more interfaces that can connect the computer system to a communication network, in addition or as an alternative to the network that may be formed by one or more of the components of the system.

According to one or more embodiments of the invention, the one or more input devices may include sensors for measuring any one or more parameters of system 10 and/or components thereof. Alternatively, the sensors, the metering valves and/or pumps, or all of these components may be connected to a communication network that is operatively coupled to the computer system. Any one or more of the above may be coupled to another computer system or component to communicate with the computer system over one or more communication networks. Such a configuration permits any sensor or signal-generating device to be located at a significant distance from the computer system and/or allow any sensor to be located at a significant distance from any subsystem and/or the controller, while still providing data therebetween. Such communication mechanisms may be affected by utilizing any suitable technique including but not limited to those utilizing wireless protocols.

The controller can include one or more computer storage media such as readable and/or writeable nonvolatile recording medium in which signals can be stored that define a program to be executed by one or more processors. The medium may, for example, be a disk or flash memory. In typical operation, the one or more processors can cause data, such as code that implements one or more embodiments of the invention, to be read from the storage medium into a memory that allows for faster access to the information by the one or more processors than does medium.

Although the computer system is described by way of example as one type of computer system upon which various aspects of the invention may be practiced, it should be appreciated that the invention is not limited to being implemented in software, or on the computer system as exemplarily shown. Indeed, rather than implemented on, for example, a general purpose computer system, the controller, or components or subsections thereof, may alternatively be implemented as a dedicated system or as a dedicated programmable logic controller (PLC) or in a distributed control system. Further, it should be appreciated that one or more features or aspects of the invention may be implemented in software, hardware or firmware, or any combination thereof. For example, one or more segments of an algorithm executable by controller 114 can be performed in separate computers, which in turn, can be communication through one or more networks.

In some particular embodiments, the controller can be configured to generate a plurality of output signals that initiates or terminates one or more cycles or stages of the sequencing batch reactor. For example, the controller can generate an output signal that actuates one or more inlet valves that fluidly connects one or more basins of the at least one sequencing batch reactor to the source of water to be treated. The controller can then generate a second output signal that preferably, but not necessarily, closes the valve and, activates an aeration system of at least one sequencing batch reactor to provide an oxygen source to, for example, a target dissolved oxygen level, e.g., about between 0.5 and 2 mg/L. The controller can thus be configured to facilitate biological sorption phenomena that aggregates at least a portion of dissolved and suspended solids. The controller can then generate a third output signal that promotes quiescent conditions in at least one of the basins that provide settling of at least a portion of the settleable components. In some cases, quiescent conditions can be effected by terminating output signals and the third output signal can be generated by the controller to promote withdrawal of any of the supernatant, e.g., by decanting, or solids-rich portions in the basin, after settling. Another output signal can then be generated, e.g., a fifth output signal, that reactivates the aeration system.

Further aspects of the invention can involve or be directed to computer-readable media, or providing computer-readable media, that facilitates the various features of the treatment approaches described herein.

For example, the computer-readable media can comprise instructions implementable on a computer system or a controller that performs a method of treating wastewater in a wastewater treatment system, the method comprising one or more steps of providing a wastewater to be treated, promoting biological sorption of the wastewater to be treated to produce a first mixed liquor, producing a solids-rich sludge and a solids-lean portion from the mixed liquor, aerobically treating a first portion of the solids-rich sludge to produce an at least partially aerobically treated sludge, anaerobically digesting a second portion of the solids-rich sludge to produce an anaerobically digested sludge, combining at least a portion of the at least partially aerobically treated sludge with the wastewater to be treated, and combining at least a portion of the anaerobically digested sludge with the wastewater to be treated. The method can further comprise thickening the solids-rich sludge to produce a thickened sludge and a sludge-lean portion and combining at least a portion of the sludge-lean portion with the wastewater to be treated, wherein anaerobically digesting the second portion of the solids-rich sludge comprises anaerobically digesting the thickened sludge to produce at least a portion of the anaerobically digested sludge. The method can further comprise aerobically treating at least a portion of the solids-lean portion to produce a treated product and a second mixed liquor. The method can further comprise combining at least a portion of the second mixed liquor with the wastewater to be treated. The method can further comprise aerobically treating at least a portion of the anaerobically digested sludge with the first portion of the solids-rich sludge to produce the at least partially aerobically treated sludge. The method can further comprise producing a solids-rich wastewater and a solids-lean wastewater from the wastewater to be treated, and wherein promoting biological sorption of at least a portion of the wastewater to be treated comprises promoting biological sorption of the solids-lean wastewater to produce the first mixed liquor. The method can further comprise introducing the solids-lean portion into a membrane bioreactor. The method can further comprise separating the wastewater to be treated into a solids-lean wastewater and a solids-rich wastewater, promoting biological sorption of the solids-lean wastewater to produce at least a portion of the first mixed liquor; and anaerobically digesting the solids-rich wastewater with the second portion of the solids-rich sludge to produce the anaerobically digested sludge and an off-gas comprising methane.

In other configurations, the computer-readable media can comprise instructions implementable on a computer system or a controller that performs a method of treating wastewater in a wastewater treatment system, the method having one or more steps for treating wastewater comprising providing a wastewater stream to be treated, introducing the wastewater stream into a biological sorption tank to produce a first mixed liquor stream, introducing the mixed liquor stream into a separator to produce a solids-rich stream and a solids-lean stream, introducing at least a portion of the solids-rich stream into an aerobic treating tank to produce an at least partially aerobically treated sludge stream, introducing at least a portion of the solids-rich stream into an anaerobic digester to produce an anaerobically digested sludge stream, introducing at least a portion of the at least partially aerobically treated sludge stream into the biological sorption tank, and introducing at least a portion of the anaerobically digested sludge stream into the biological sorption tank. The method can further comprise, in some cases, introducing at least a portion of the solids-rich stream into a sludge thickener to produce a thickened sludge stream and a sludge-lean stream. In some cases, introducing at least a portion of the solids-rich stream into an anaerobic digester comprises introducing the thickened sludge stream into the anaerobic digester to produce the anaerobically digested sludge stream. In still further cases, introducing the wastewater stream into the biological sorption tank comprises introducing the wastewater stream to be treated into a primary separator to produce a solids-rich wastewater stream and a solids-lean wastewater stream, and introducing the solids-lean wastewater stream into the biological sorption tank to produce the first mixed liquor stream. The method can further comprise introducing the solids-rich wastewater stream into the anaerobic digester to produce at least a portion of the anaerobically digested sludge stream. The method can further comprise introducing at least a portion of the anaerobically digested sludge stream into the aerobic treating tank to produce at least a portion of the at least partially aerobically treated sludge stream. The method can further comprise introducing the solids-lean stream from the separator into a membrane bioreactor. The method can further comprise introducing at least a portion of the solids-lean stream into an aerobic polishing system to produce a treated stream and a second mixed liquor stream, and introducing at least a portion of the second mixed liquor stream into the biological sorption tank. The method can further comprise collecting an off-gas from the anaerobic digester, the off-gas comprising methane.

The function and advantage of these and other embodiments of the systems and techniques disclosed herein will be more fully understood from the example below. The following example is intended to illustrate the benefits of the disclosed treatment approach, but do not exemplify the full scope thereof.

EXAMPLE 1

Figure 9:
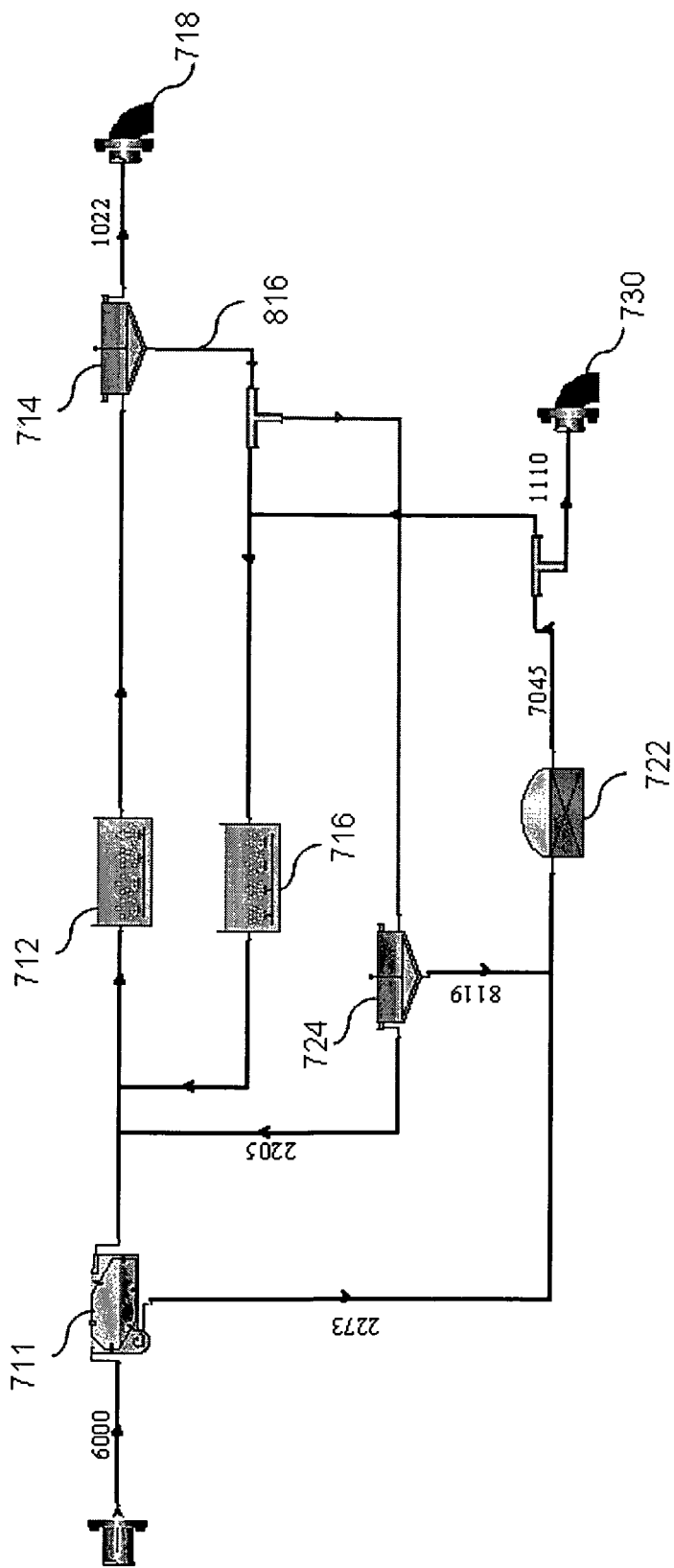
FIG. 9 is a process flow diagram illustrating another representative treatment system pertinent to one or more aspects of the invention.

Energy gain and sludge yield were estimated by numerically simulating the treatment system shown in FIG. 9. As illustrated, the proposed treatment system was considered to have a primary clarifier 711 fluidly connected to the influent or source of wastewater to be treated. Primary clarifier was considered to produce a solids lean wastewater stream and a solids rich wastewater stream. The solids lean wastewater was considered to be introduced into a biological sorption tank 712 to produce a mixed liquor, and the solids rich wastewater stream was considered to be introduced into an anaerobic digester 722. The mixed liquor from biological sorption tank 712 was considered to be introduced into a separator 714 to produce a solids lean stream which was to be further treated in a membrane bioreactor, and a sludge stream. A portion of the sludge was to be introduced into a sludge thickener 724 to produce a thickened sludge and a solids-lean sludge. Another portion of the sludge was considered to be introduced into an aerobic treatment tank 716 to produce an at least partially aerobically treated sludge which was recycled and treated in biological sorption tank 712, with the solids lean wastewater. The thickened sludge was considered to be introduced into an anaerobic digester 722 to produce biologically digested sludge, of which a portion was recycled to be at least partially aerobically treated in treatment tank 716, and another portion of the digested sludge was discharged as solids waste 730.

The treatment system was numerically simulated using BIOWIN simulation software, EnviroSim Associates Ltd., Ontario, Canada. The simulation runs were performed such that 2 to 20 percent of the solids-rich sludge 816 exiting the separator or clarifier 714 was directed to thickener 724 and ultimately anaerobic digester 722.

Typical wastewater concentrations were used for the simulations; and detailed raw wastewater stoichiometry is listed in Table 1.

TABLE 1

Raw Wastewater Concentration and Stoichiometry (with corresponding parameters for the BIOWIN simulation software).

| | |
|---|---|
| Flow rate [$m^3$/day] | 10,000 |
| Total COD [mg/L] | 600 |
| Total Kjeldahl Nitrogen [mg/L] | 50 |
| TSS [mg/L] | 280 |
| Fbs - Readily biodegradable (including Acetate) [gCOD/g of total COD] | 0.1600 |
| Fac - Acetate [gCOD/g of readily biodegradable COD] | 0.1500 |
| Fxsp - Non-colloidal slowly biodegradable [gCOD/g of slowly degradable COD] | 0.7500 |
| Fus - Unbiodegradable soluble [gCOD/g of total COD] | 0.0500 |
| Fup - Unbiodegradable particulate [gCOD/g of total COD] | 0.1300 |
| Fna - Ammonia [gNH3—N/gTKN] | 0.6600 |
| Fnox - Particulate organic nitrogen [gN/g Organic N] | 0.5000 |
| Fnus - Soluble unbiodegradable TKN [gN/gTKN] | 0.0200 |
| FupN - N:COD ratio for unbiodegradable part. COD [gN/gCOD] | 0.0350 |
| Fpo4 - Phosphate [gPO4—P/gTP] | 0.5000 |
| FupP - P:COD ratio for influent unbiodegradable part. COD [gP/gCOD] | 0.0110 |
| FZbh - Non-poly-P heterotrophs [gCOD/g of total COD] | 0.0001 |
| FZbm - Anoxic methanol utilizers [gCOD/g of total COD] | 0.0001 |
| Fzaob - Ammonia oxidizers [gCOD/g of total COD] | 0.0001 |
| Fznob - Nitrite oxidizers [gCOD/g of total COD] | 0.0001 |
| Fzamob - Anaerobic ammonia oxidizers [gCOD/g of total COD] | 0.0001 |
| FZbp - PAOs [gCOD/g of total COD] | 0.0001 |
| FZbpa - Propionic acetogens [gCOD/g of total COD] | 0.0001 |
| Fzbam - Acetoclastic methanogens [gCOD/g of total COD] | 0.0001 |
| FZbhm - H2 - utilizing methanogens [gCOD/g of total COD] | 0.0001 |

The following operating parameters of the main unit processes were assumed.

| | |
|---|---|
| Primary clarifier | 60% TSS removal |
| Sludge thickener | 80% TSS removal |
| Total RAS flow | 100% of influent flow |
| Biological sorption tank | 500 $m^3$ with DO set point of 2 mg/L |
| Aerobic stabilization tank | 600 $m^3$ with DO set point of 2 mg/L |
| Anaerobic digester: | 2900 $m^3$ |

The following assumptions were made for the energy balance calculations.

The energy content of $CH_4$ is 35846 kJ/$m^3$ (at 0° C. and 1 atm) (Tchobanoglous et al., Wastewater Engineering Treatment and Reuse, *Metcalf & Eddy* 2004)

Aeration energy efficiency in the biological sorption tank and aerobic treatment tank would be 1.52 kg $O_2$/KWh (Tchobanoglous et al., Wastewater Engineering Treatment and Reuse, *Metcalf & Eddy* 2004)

Mixing energy for the anaerobic digester would be 0.008 KW/$m^3$ when the TSS concentration in anaerobic digester is less than 40 gram/L (Tchobanoglous et al., Wastewater Engineering Treatment and Reuse, *Metcalf & Eddy* 2004)

Downstream membrane filtration air scouring and filtration energy would be 0.2 kwh/$m^3$ of effluent, and the $O_2$ transfer from the MBR air scoring would be enough for nitrification The mixed liquor entering the anaerobic digester will be heated from 20° C. to 35° C., without heat exchange to recover energy.

When 2% of the return activated sludge (RAS) enters anaerobic digester 722, all the digester effluent is to be wasted out of the system as waste activated sludge 730, and no anaerobic sludge is to be recycled back to biological sorption tank 712. The minimum RAS entering anaerobic digester 722 appears to be about 2%.

The predicted energy gain from methane production, aeration energy reduction, net energy gain, percentage of the COD removal by anaerobic digester and sludge yield are shown in FIGS. 4 to 8.

When 20% of RAS enters anaerobic digester 722, the simulation software generated the following data:
influent into primary clarifier 711: 6000 kg COD/day
settled materials of out primary clarifier 711: 2273 kg COD/day
effluent out of secondary clarifier 714 to MBR 718: 1022 kg COD/day
solids-lean portion out of sludge thickener 724: 2205 kg COD/day
thickened portion into anaerobic digester 722: 8119 kg COD/day
effluent out of anaerobic digester 722: 7045 kg COD/day
effluent out of anaerobic digester 722 to WAS 730: 1110 kg COD/day The sludge retention time in anaerobic digester 722 would be about 16.1 days and the TSS concentration in anaerobic digester 722 would be 40763 mg/L.

The aerobic sludge retention time, or MLSS inventory in biological sorption tank 712 and aerobic treatment tank 716 relative to a 20% RAS mass flow rate would be 0.7 days.

The total COD removal would be 3868 kg COD/day (6000−1110−1022).

COD removal through the anaerobic digester 722 would be 3347 kg COD per day (2273+8119−7045), or a predicted removal rate of 87% (3347/3868).

Aerobic COD removal would be 13% so the aeration energy consumption is low, but probably still enough to mix the tanks.

About 87% of the COD removal would occur when 20% of RAS enters anaerobic digester. Thus, about 20%, or less, of the RAS can be introduced into the anaerobic digester to provide significant COD removal.

Figure 5:
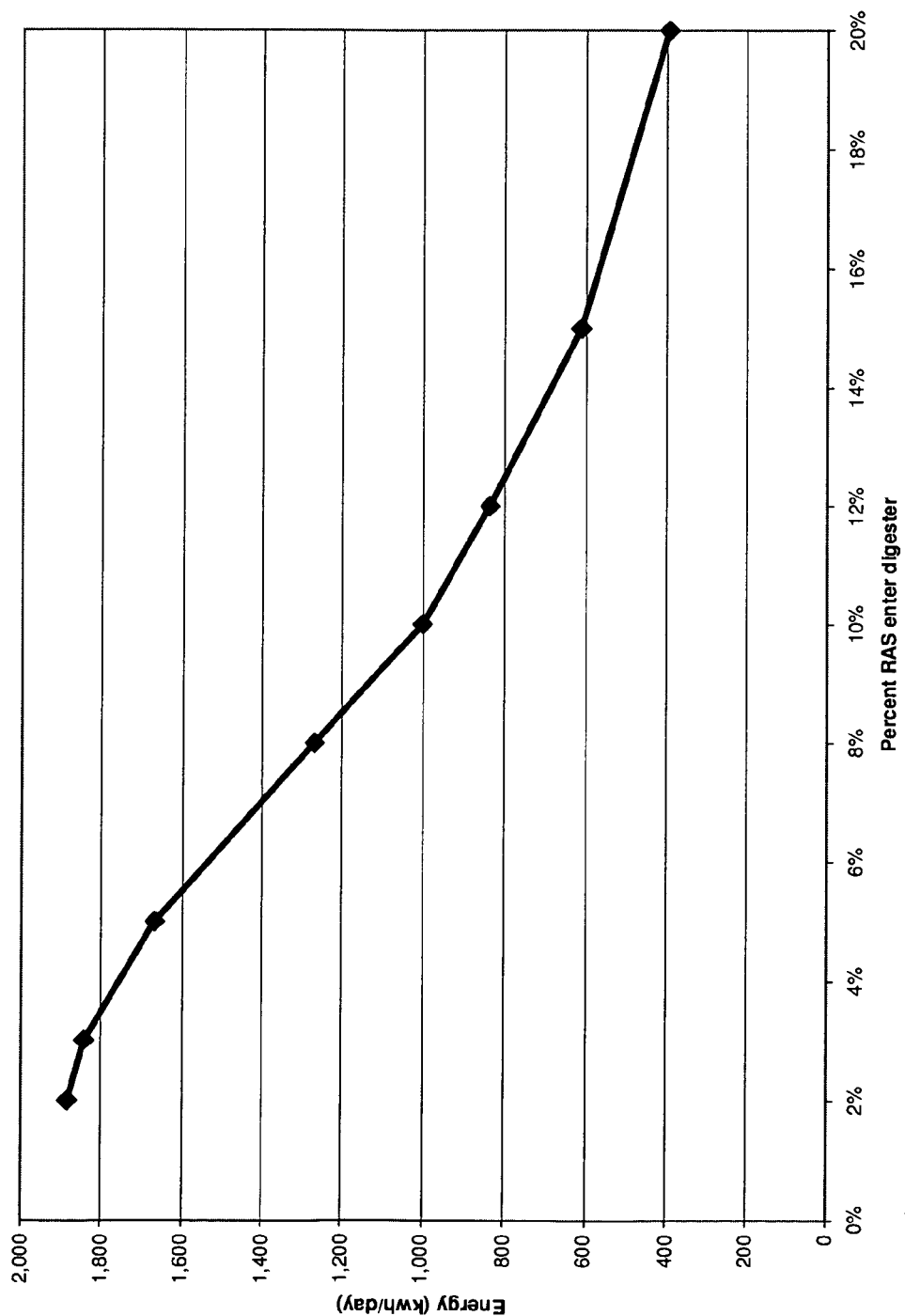
FIG. 5 is a graph of aeration energy reduction versus percent activated sludge entering the anaerobic digester for a treatment system pertinent to one or more aspects of the invention.
Figure 6:
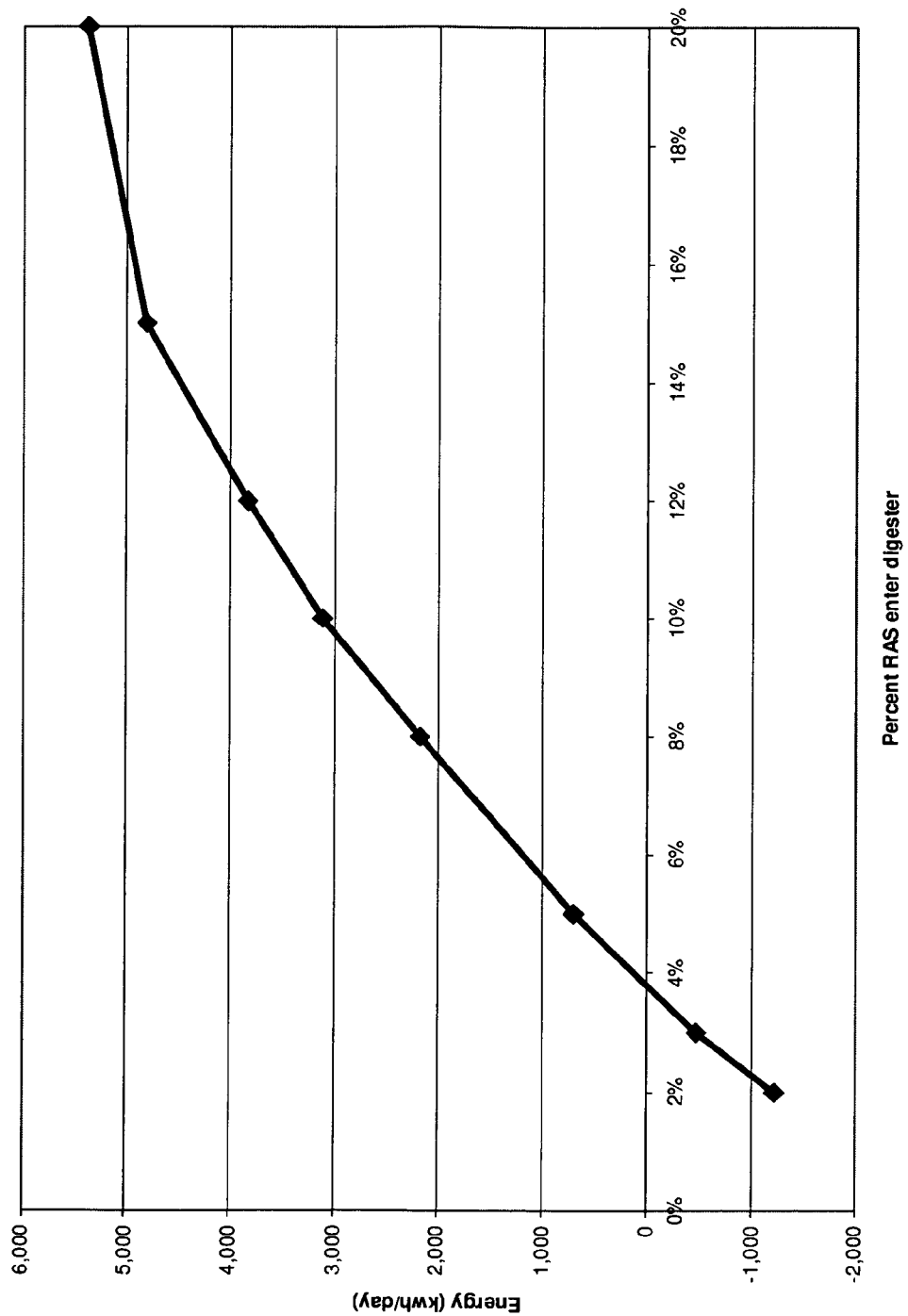
FIG. 6 is a graph of net energy gain versus percent activated sludge entering the anaerobic digester for a treatment system pertinent to one or more aspects of the invention.
Figure 7:
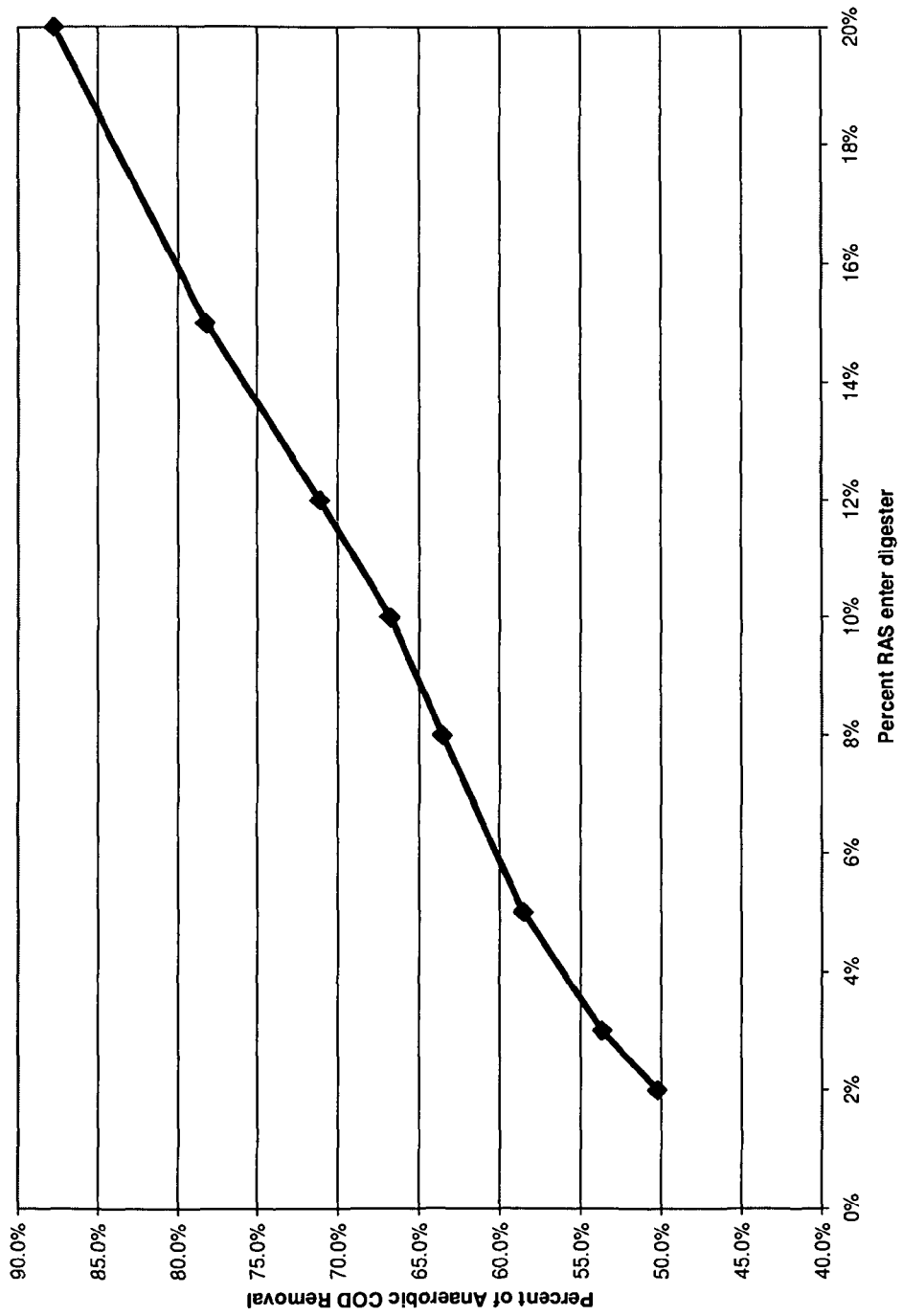
FIG. 7 is a graph of percentage of the COD removal by anaerobic digester energy versus percent activated sludge entering the anaerobic digester for a treatment system pertinent to one or more aspects of the invention.
Figure 8:
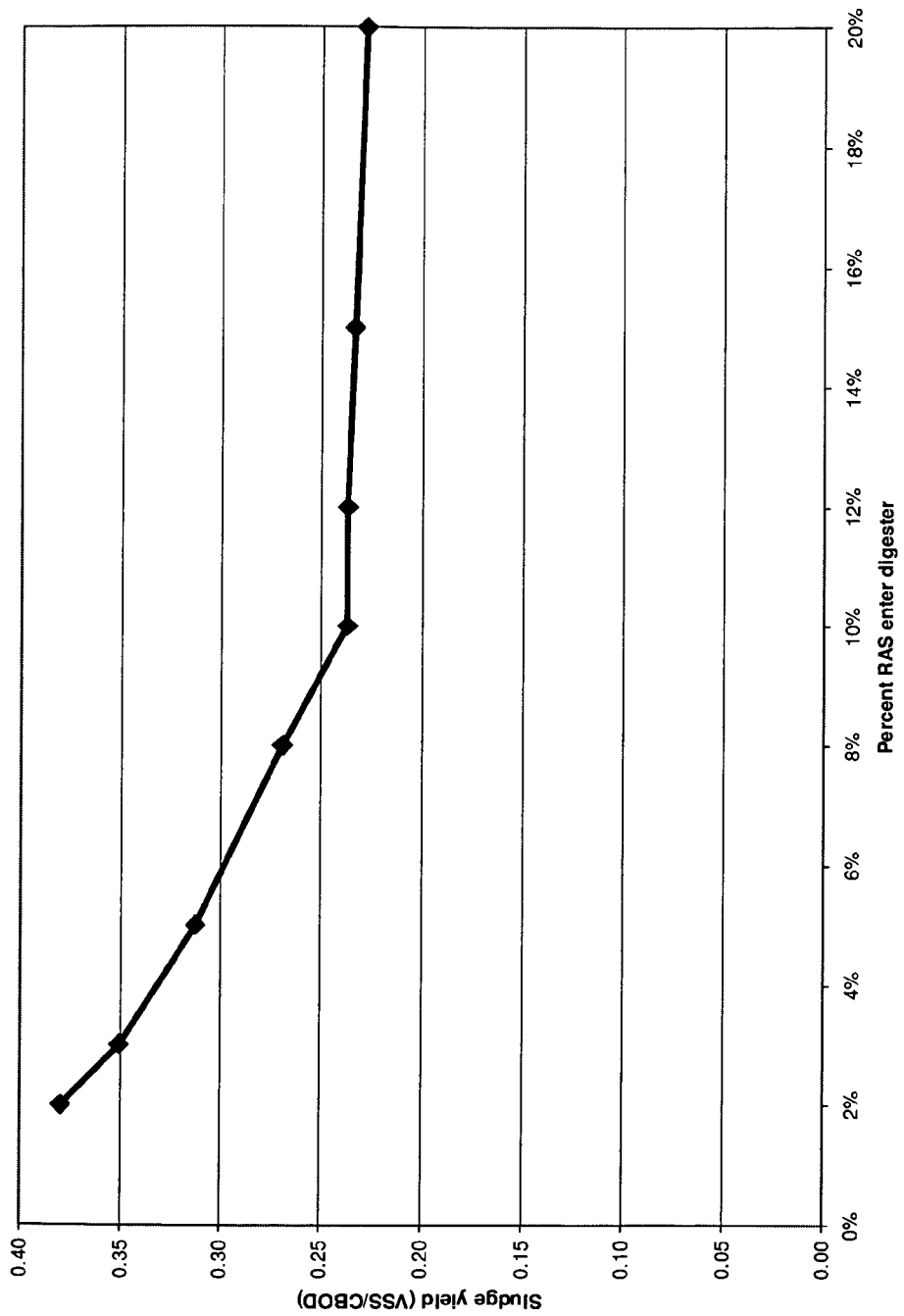
FIG. 8 is a graph of sludge yield versus percent return activated sludge entering the anaerobic digester for a treatment system pertinent to one or more aspects of the invention.

When more sludge goes through anaerobic digester 722, the aerobic activity decreases (see FIG. 5). When about 20% RAS enters anaerobic digester 722, the oxygen utilization rate (OUR) in biological sorption tank 712 and aerobic treatment tank 716 would be 21 mgO$_2$/L per hour and 22 mgO$_2$/L per hour, respectively. Although 80% of the RAS goes through aerobic treatment tank, the COD reduction rate in that tank appears to be low. The COD mass flow diagram at the condition of 20% of return activated sludge entering the anaerobic digester is shown in FIG. 9, with COD mass flow rate in kgCOD/day.

Further, potential benefits may be realized in terms of increased methane and reduced sludge production with between about 5% to about 8% RAS anaerobically digested, which can avoid capital expenditures associated with large anaerobic digestion processes.

The results also show that existing wastewater treatment facilities can be modified or retrofitted to incorporate one or more various aspects of the systems and techniques disclosed herein to treat water at a reduced energy rate and reduced amount of sludge.

Those skilled in the art would readily appreciate that the various parameters and configurations described herein are meant to be exemplary and that actual parameters and configurations will depend upon the specific application for which the systems and methods of the present invention are used. Those skilled in the art will recognize, or be able to ascertain using no more than routine experimentation, many equivalents to the specific embodiments described herein. For example, those skilled in the art may recognize that the system, and components thereof, according to the present invention may further comprise a network of systems or be a component of treatment system. It is, therefore, to be understood that the foregoing embodiments are presented by way of example only and that, within the scope of the appended claims and equivalents thereto, the disclosed treatment systems and techniques may be practiced otherwise than as specifically described. For example, although the term "supernatant" has been used herein to refer to separation product, the term has been used only for illustrative purposes and its use does not limit the scope of the claims to a particular separation technique. The present treatment systems and techniques are directed to each individual feature, system, or method described herein. In addition, any combination of two or more such features, systems or methods, if such features, systems or methods are not mutually inconsistent, is included within the scope of the present invention.

Further, it is to be appreciated various alterations, modifications, and improvements will readily occur to those skilled in the art. Such alterations, modifications, and improvements are intended to be part of this disclosure, and are intended to be within the spirit and scope of the invention. For example, a portion of solids-rich stream or the sludge stream can be introduced to an upstream unit operation, such as a primary clarifier, or a biological sorption tank, or both. In other cases, the solids leans portion or the sludge lean portion can be directed to another separator and/or to a polishing unit. In other instances, an existing treatment facility may be modified to utilize or incorporate any one or more aspects of the invention. Thus, in some cases, the treatment systems can involve connecting or configuring an existing facility to comprise an aerobic digester, optionally with a biological sorption tank, and an aerobic treatment tank. Accordingly, the foregoing description and drawings are by way of example only. Further, the depictions in the drawings do not limit the inventions to the particularly illustrated representations. For example, one or more biological reactors may be utilized in one or more trains of the treatment system.

Use of ordinal terms such as "first," "second," "third," and the like in the specification and claims to modify an element does not by itself connote any priority, precedence, or order of one element over another or the temporal order in which acts of a method are performed, but are used merely as labels to distinguish one element having a certain name from another element having a same name, but for use of the ordinal term, to distinguish the elements.

What is claimed is:

1. A process for treating wastewater comprising:
providing a wastewater to be treated;
promoting biological sorption of the wastewater to be treated in a biological sorption tank to produce a first mixed liquor;
producing a solids-rich sludge and a solids-lean portion from the mixed liquor;
aerobically treating a first portion of the solids-rich sludge to produce an at least partially aerobically treated sludge;
anaerobically digesting a second portion of the solids-rich sludge to produce an anaerobically digested sludge;
combining at least a portion of the at least partially aerobically treated sludge with the wastewater to be treated; and
combining at least a portion of the anaerobically digested sludge with the wastewater to be treated.

2. The process of claim 1, further comprising:
thickening the solids-rich sludge to produce a thickened sludge and a sludge-lean portion; and
combining at least a portion of the sludge-lean portion with the wastewater to be treated,
wherein anaerobically digesting the second portion of the solids-rich sludge comprises anaerobically digesting the thickened sludge to produce at least a portion of the anaerobically digested sludge.

3. The process of claim 1, further comprising aerobically treating at least a portion of the solids-lean portion to produce a treated product and a second mixed liquor.

4. The process of claim 3, further comprising combining at least a portion of the second mixed liquor with the wastewater to be treated.

5. The process of claim 1, further comprising aerobically treating at least a portion of the anaerobically digested sludge with the first portion of the solids-rich sludge to produce the at least partially aerobically treated sludge.

6. The process of claim 1, further comprising producing a solids-rich wastewater and a solids-lean wastewater from the wastewater to be treated, and wherein promoting biological sorption of at least a portion of the wastewater to be treated comprises promoting biological sorption of the solids-lean wastewater to produce the first mixed liquor.

7. The process of claim 1, further comprising introducing the solids-lean portion into a membrane bioreactor.

8. The process of claim 1, further comprising:
separating the wastewater to be treated into a solids-lean wastewater and a solids-rich wastewater;
promoting biological sorption of the solids-lean wastewater to produce at least a portion of the first mixed liquor; and
anaerobically digesting the solids-rich wastewater with the second portion of the solids-rich sludge to produce the anaerobically digested sludge and an off-gas comprising methane.

9. A process for treating wastewater comprising:
providing a wastewater stream to be treated;
introducing the wastewater stream into a biological sorption tank to produce a first mixed liquor stream;
introducing the mixed liquor stream into a separator to produce a solids-rich stream and a solids-lean stream;
introducing at least a portion of the solids-rich stream into an aerobic treating tank to produce an at least partially aerobically treated sludge stream;
introducing at least a portion of the solids-rich stream into an anaerobic digester to produce an anaerobically digested sludge stream;
introducing at least a portion of the at least partially aerobically treated sludge stream into the biological sorption tank; and
introducing at least a portion of the anaerobically digested sludge stream into the biological sorption tank.

10. The process of claim 9, further comprising introducing at least a portion of the solids-rich stream into a sludge thickener to produce a thickened sludge stream and a sludge-lean stream.

11. The process of claim 10, wherein introducing at least a portion of the solids-rich stream into an anaerobic digester comprises introducing the thickened sludge stream into the anaerobic digester to produce the anaerobically digested sludge stream.

12. The process of claim 9, wherein introducing the wastewater stream into the biological sorption tank comprises introducing the wastewater stream to be treated into a primary separator to produce a solids-rich wastewater stream and a solids-lean wastewater stream, and introducing the solids-lean wastewater stream into the biological sorption tank to produce the first mixed liquor stream.

13. The process of claim 12, further comprising introducing the solids-rich wastewater stream into the anaerobic digester to produce at least a portion of the anaerobically digested sludge stream.

14. The process of claim 13, further comprising introducing at least a portion of the anaerobically digested sludge stream into the aerobic treating tank to produce at least a portion of the at least partially aerobically treated sludge stream.

15. The process of claim 9, further comprising introducing the solids-lean stream from the separator into a membrane bioreactor.

16. The process of claim 9, further comprising:
introducing at least a portion of the solids-lean stream into an aerobic polishing system to produce a treated stream and a second mixed liquor stream; and
introducing at least a portion of the second mixed liquor stream into the biological sorption tank.

17. The process of claim 9, further comprising collecting an off-gas from the anaerobic digester, the off-gas comprising methane.

18. A wastewater treatment system comprising:
a source of a wastewater to be treated;
a biological sorption tank having a sorption tank inlet fluidly connected to the source of the wastewater;
a separator fluidly having a separator inlet fluidly connected downstream from the biological sorption tank, a sludge outlet, and a solids-lean outlet;
an aerobic treatment tank having an aerobic tank inlet fluidly connected downstream from the sludge outlet, and an at least partially aerobically treated sludge outlet fluidly connected to the sorption tank inlet; and
an anaerobic digester having a digester inlet fluidly connected downstream from the sludge outlet, and a digested sludge outlet fluidly connected upstream of the sorption tank inlet.

19. The wastewater treatment system of claim 18, further comprising a sludge thickener having a thickener inlet fluidly connected downstream from the sludge outlet, a thickened sludge outlet fluidly connected upstream of the digester inlet, and a sludge-lean outlet fluidly connected upstream of the sorption tank inlet.

20. The wastewater treatment system of claim 18, wherein the anaerobic digester is fluidly connected upstream of the sorption tank inlet through the aerobic treatment tank.

21. The wastewater treatment system of claim 18, further comprising a primary separator having a primary separator inlet fluidly connected to the source of wastewater to be treated, a solids-lean wastewater outlet fluidly connected upstream of the sorption tank inlet.

22. The wastewater treatment system of claim 21, wherein the primary separator further comprises a solids-rich wastewater outlet fluidly connected upstream of the digester inlet.

23. The wastewater treatment system of claim 18, further comprising an aerobic polishing unit fluidly connected downstream from the solids-lean outlet of the separator.

24. The wastewater treatment system of claim 23, further comprising a mixed liquor recycle line fluidly connecting an outlet of the aerobic polishing unit and the sorption tank inlet.

25. The wastewater treatment system of claim 18, further comprising a membrane bioreactor fluidly connected downstream from the separator.

26. A wastewater treatment system comprising:
- a source of wastewater to be treated;
- a sequencing batch reactor having a basin with a basin inlet fluidly connectable to the source of the wastewater, an aeration system, a sludge collection system with a sludge outlet, and a decanting system with a supernatant outlet;
- an anaerobic digester having a digester inlet fluidly connectable downstream from the sludge outlet, and a digested sludge outlet fluidly connectable to the basin inlet;
- a sludge thickener fluidly connectable downstream from the sludge outlet, the sludge thickener having a thickened sludge outlet fluidly connectable to the digester inlet and configured to direct all of a thickened sludge produced in the sludge thickener into the digester inlet, and a sludge-lean outlet fluidly connectable upstream of the basin inlet; and
- a controller configured to generate a first output signal that provides fluid communication between the basin inlet and the source of wastewater, and a second signal that provides fluid communication between the sludge outlet and the digester inlet.

27. The wastewater treatment system of claim 26, wherein the controller is further configured to generate a third output signal that activates the aeration system.

28. The wastewater treatment system of claim 27, wherein the controller is further configured to generate a fourth output signal that promotes quiescent conditions in the sequencing batch reactor after activation of the aeration system.

29. The wastewater treatment system of claim 28, wherein the controller is further configured to generate a fifth output signal that activates the decanting system after generating the fourth output signal.

30. The wastewater treatment system of claim 29, wherein the controller is further configured to generate a sixth output signal that activates the aeration system after generating the fifth output signal.

31. The wastewater treatment system of claim 26, further comprising a membrane bioreactor fluidly connectable downstream from the supernatant outlet.

32. The wastewater treatment system of claim 26, further comprising an aerobic polishing unit fluidly connectable downstream from the supernatant outlet.

33. The wastewater treatment system of claim 26, further comprising a primary separator having a separator inlet fluidly connected to the source of wastewater, and a solids-lean wastewater outlet fluidly connectable to the basin inlet.

34. The wastewater treatment system of claim 33, wherein the primary separator further comprises a solids-rich wastewater outlet fluidly connectable to the digester inlet.

35. A wastewater treatment system comprising:
- a source of wastewater to be treated;
- a biological treatment train fluidly connected to the source of wastewater to be treated, the first treatment train comprising at least one biological reactor selected from the group consisting of an anaerobic reactor, an anoxic reactor, and an aerobic reactor;
- a separator having an inlet fluidly connected downstream from the at least one biological reactor, a solids-rich outlet fluidly connected upstream of an inlet of an anaerobic digester and configured to direct all of a thickened sludge produced in the separator into the inlet of the anaerobic digester, and a solids-lean outlet fluidly connected upstream of an inlet of the at least one biological reactor; and
- a digested anaerobic sludge recycle line fluidly connecting a digested sludge outlet of the anaerobic digester and an inlet of the at least one biological reactor.

36. The wastewater treatment system of claim 35, wherein the at least one biological reactor comprises at least one sequencing batch reactor.

37. The wastewater treatment system of claim 35, further comprising a primary separator having a separator inlet fluidly connected to the source of wastewater and a solids-lean wastewater outlet fluidly connectable to the basin inlet.

38. A method of facilitating wastewater treatment in a wastewater treatment system having a biological treatment train with at least one biological reactor selected from the group consisting of an anaerobic reactor, an anoxic reactor, and an aerobic reactor, the method comprising:
- fluidly connecting a solids-rich outlet of the biological treatment train upstream of an inlet of a separator;
- fluidly connecting a solids-rich outlet of the separator directly to an inlet of a sludge thickener;
- fluidly connecting a solids-rich outlet of the sludge thickener directly to an inlet of an anaerobic digester, the solids-rich outlet of the sludge thickener configured to direct all of a thickened sludge produced in the sludge thickener into the inlet of the anaerobic digester;
- fluidly connecting a solids-lean outlet of the separator upstream of an inlet of the at least one biological reactor; and
- fluidly connecting a digested sludge outlet of the anaerobic digester upstream of an inlet of the at least one biological reactor.

39. The method of claim 38, wherein the at least one biological reactor comprises a sequencing batch reactor.

40. The method of claim 38, further comprising fluidly connecting an outlet of a primary clarifier upstream of an inlet of the at least one biological reactor.

\* \* \* \* \*